United States Patent
Saito

(10) Patent No.: US 7,460,283 B2
(45) Date of Patent: Dec. 2, 2008

(54) COLOR SEPARATION TABLE GENERATION METHOD AND IMAGE PROCESSING APPARATUS

(75) Inventor: Kazuhiro Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1075 days.

(21) Appl. No.: 10/718,602

(22) Filed: Nov. 24, 2003

(65) Prior Publication Data

US 2004/0100640 A1 May 27, 2004

(30) Foreign Application Priority Data

Nov. 27, 2002 (JP) .............................. 2002-344508

(51) Int. Cl.
  *G03F 3/00* (2006.01)
  *G03F 3/10* (2006.01)
(52) U.S. Cl. ...................... 358/515; 358/3.23; 358/518; 358/525
(58) Field of Classification Search .................. 358/1.1, 358/1.9, 518–523, 3.23, 504, 515, 525; 382/162–167
See application file for complete search history.

(56) References Cited

U.S. PATENT DOCUMENTS

| | | | | |
|---|---|---|---|---|
| 4,334,240 A | * | 6/1982 | Franklin | ..................... 358/525 |
| 5,187,594 A | * | 2/1993 | Deutsch et al. | ............. 358/3.13 |
| 6,307,645 B1 | * | 10/2001 | Mantell et al. | ................ 358/1.9 |
| 6,724,500 B1 | * | 4/2004 | Hains et al. | .................... 358/1.9 |
| 2002/0021458 A1 | | 2/2002 | Saito et al. | ................... 358/515 |
| 2003/0076516 A1 | | 4/2003 | Saito | ........................... 358/1.9 |
| 2003/0090713 A1 | | 5/2003 | Saito | ......................... 358/1.15 |
| 2003/0202197 A1 | | 10/2003 | Saito et al. | .................... 358/1.9 |
| 2003/0202213 A1 | | 10/2003 | Saito | ......................... 358/1.18 |
| 2003/0234946 A1 | | 12/2003 | Saito | ........................... 358/1.9 |
| 2004/0027406 A1 | | 2/2004 | Nishikawa et al. | ............. 347/19 |
| 2004/0070777 A1 | | 4/2004 | Nishikawa et al. | ............ 358/1.9 |

FOREIGN PATENT DOCUMENTS

JP     2002-33930     1/2002

* cited by examiner

*Primary Examiner*—King Y Poon
*Assistant Examiner*—Lawrence E Wills
(74) *Attorney, Agent, or Firm*—Fitzpatrick, Cella, Harper & Scinto

(57) ABSTRACT

When a special color, which is a color other than the vertexes of the RGB cube during the generation of a color separation table, is used as an ink color, the invention sets a grid point for the special color on a side connecting cube vertexes. Then it becomes possible, by determining in advance grid point data based on a color measurement on the line including the grid point of the special color, to prepare a color conversion table having a uniform grid point density in the uniform color space even when a special color other than red, green and blue is used.

18 Claims, 26 Drawing Sheets

FIG.17A

| IDENTIFIED BA PATTERN "CONSTANT" | | IDENTIFIED AO PATTERN | | | |
|---|---|---|---|---|---|
| | | CONSTANT | MONOTONE INCREASE | MONOTONE DECREASE | CONVEX |
| IDENTIFIED BO PATTERN | CONSTANT | | | | |
| | MONOTONE INCREASE | | | | |
| | MONOTONE DECREASE | | | | |
| | CONVEX | | | | |

FIG.17B

| IDENTIFIED BA PATTERN "MONOTONE INCREASE" | | IDENTIFIED AO PATTERN | | | |
|---|---|---|---|---|---|
| | | CONSTANT | MONOTONE INCREASE | MONOTONE DECREASE | CONVEX |
| IDENTIFIED BO PATTERN | CONSTANT | | | | |
| | MONOTONE INCREASE | | | | |
| | MONOTONE DECREASE | | | | |
| | CONVEX | | | | |

FIG.17C

| IDENTIFIED BA PATTERN "MONOTONE DECREASE" | | IDENTIFIED AO PATTERN | | | |
|---|---|---|---|---|---|
| | | CONSTANT | MONOTONE INCREASE | MONOTONE DECREASE | CONVEX |
| IDENTIFIED BO PATTERN | CONSTANT | | | | |
| | MONOTONE INCREASE | | | | |
| | MONOTONE DECREASE | | | | |
| | CONVEX | | | | |

FIG.17D

| IDENTIFIED BA PATTERN "CONVEX" | | IDENTIFIED AO PATTERN | | | |
|---|---|---|---|---|---|
| | | CONSTANT | MONOTONE INCREASE | MONOTONE DECREASE | CONVEX |
| IDENTIFIED BO PATTERN | CONSTANT | | | | |
| | MONOTONE INCREASE | | | | |
| | MONOTONE DECREASE | | | | |
| | CONVEX | | | | |

COLOR SEPARATION TABLE GENERATION METHOD AND IMAGE PROCESSING APPARATUS

This application claims priority from Japanese Patent Application No. 2002-344508 filed Nov. 27, 2002, which is incorporated hereinto by reference.

BACKGROUND OF THE INVENTION

1. Field of the Invention

The invention relates to a color separation table generation method and image processing system, and more particularly, to generating a color separation table that converts color signals forming image data into color signals of printing materials such as inks used In printing.

2. Description of the Related Art

In a process of converting color signals of image data into color signals of printing materials such as inks used in a printing apparatus such as a color printer (hereinafter, called the ink color separation process), it is a usual practice to use a color separation table. As an example of methods of generating a color separation table, the technique described in Japanese Patent Application Laid-open No. 2002-33930 is well known. In general, the color separation table is a table in which ink color signals, namely, the values (ink quantities) of Y(yellow), M(magenta), C(cyan) and K(black) inks are stored as grid point data correspondingly to grid points, which are determined by color signal values of, for example, R, G and B. The method described in the above document divides the cube formed by grid points in the RGB color space into six tetrahedrons each of which has four vertexes taken from the vertexes of the cube. Then, ink quantities (grid point data) are determined for the grid points on each of the sides consisting each of the four triangles constituting each tetrahedron, and the ink quantity is determined for each grid point located not on those sides but inside the tetrahedron by interpolation based on the ink quantities on the grid points on each side.

According to this method, which can generate a color separation table in which a using black beginning point is determined for each hue, the color reproduction range by each color ink can be utilized to the most, and granular impression provided by black ink dots can be nicely weakened. Additionally, determining of the black signal generation can be made while controlling the relations between hues, and thus granular impression can be reduced while maximizing the color reproduction range in the whole color range by employed inks.

On the other hand, as a trend in printing apparatuses such as inkjet printers, image printing quality is expected to be higher. As a means for meeting this need, a special color ink is used in addition to usual cyan, magenta, yellow and black inks. In this case, the color separation table needs to correspond to the printing materials including such a special color.

Japanese Patent Application Laid-open No. 2002-033930 also describes a color separation table generation method in the case of using, in addition to cyan, magenta, yellow and black, special colors such as red(R) and green(G) that are secondary colors of cyan, magenta and yellow.

This method, for example when a red is added as a new printing material, sets respective grid points corresponding to a secondary color, which are located at the respective midpoints of the lines connecting R and Y and connecting R and M (R, Y and M are cube vertexes), as respective vertexes of the new tetrahedrons. Then, in each of these tetrahedrons, the ink quantity for each grid point located not on a side but inside the tetrahedron is determined by interpolation using the grid point data for each side of each of the divided triangles (see FIG. 21 of the above document). In other words, since red is used as a primary color, it becomes possible to determine the black signal generation for hue of the secondary color by setting the midpoints of the secondary colors of red and Y as well as M.

However, according to the method disclosed in the above document, it may not be possible to generate an appropriate color separation table when using, for example, the printing material of orange as the special color, other than red, green and blue that are secondary colors of cyan, magenta and yellow.

More specifically, Japanese Patent Application Laid-open No. 2002-033930 discloses a special color separation table generation method to be used when the primary colors, which are printing material colors, exist in the vertexes of the cube in the RGB space. However, such a special color as orange is not a color that exists at any vertexes of the cube As a result, if the method disclosed in Japanese Patent Application Laid-open No. 2002-033930 is used when orange is used as a special color, namely, when orange is used as a special color in addition to cyan, magenta, yellow and black, orange may be considered to be placed in one vertex of the cube, for example, R. However, in this case, the grid point density becomes non-uniform in the uniform color space of the color separation table due to difference in properties between the color reproduction range of orange ink and that of a secondary color made of yellow ink and magenta ink. As a result it is impossible to perform precise color separation.

SUMMARY OF THE INVENTION

Object of the present invention is to provide a color separation table generation method and an image processing apparatus that can generating an appropriate color separation table corresponding to a special color ink even when such a special color ink is not red, green or blue that is a secondary color of cyan, magenta and yellow In the first aspect of the present invention, there is provided a method of generating a color separation table that stores grid point data of printing material colors used in a printing apparatus correspondingly to grid points that are defined by predetermined input colors for converting the predetermined input colors to the printing material colors, which include a special color other than colors corresponding to vertexes of a solid formed by the grid points, the method comprising:

special color point setting step for setting a point of the special color on a side connecting two vertexes of the solid;

table data generating step for, for the grid points on each of a line connecting two vertexes of black and white on the solid, a line running on the surface of the solid and connecting a plurality of vertexes of the solid and a line running on the surface of the solid and connecting a plurality of the vertexes of the solid as well as the point of the special color, obtaining the grid point data based on the color measurement of predetermined patches; and interpolation step for dividing the solid by the lines into a plurality of solids which include the line as a side and executing an interpolation process on the plurality of divided solids based on the grid point data of the grid points on the lines to obtain grid point data for the grid points located on other than the lines in each of the divided solids. In the second aspect of the present invention, there is provided an image processing apparatus for generating a color separation table that stores grid point data of printing material colors used in a printing apparatus correspondingly to grid points that are defined by predetermined input colors for converting the predetermined input colors to the printing material colors, which include a special color other than colors corresponding to vertexes of a solid formed by the grid points, the apparatus comprising:

special color point setting means for setting a point of the special color on a side connecting two vertexes of the solid;

table data generating means for, for the grid points on each of a line connecting two vertexes of black and white on the solid, a line running on the surface of the solid and connecting a plurality of vertexes of the solid and a line running on the surface of the solid and connecting a plurality of the vertexes of the solid as well as the point of the special color, obtaining the grid point data based on the color measurement of predetermined patches; and interpolation means for dividing the solid by the lines into a plurality of solids which include the line as a side and executing an interpolation process on the plurality of divided solids based on the grid point data of the grid points on the lines to obtain grid point data for the grid points located on other than the lines in each of the divided solids.

According to the above configuration, when generating a color separation table, the point of a special color other than colors corresponding to the vertexes of the cube is set on a side of the cube, which connects two vertexes of the cube corresponding to the color separation table defined by input colors Then based on the color measurement of predetermined patches, grid point data is obtained for grid points on each of a line connecting two vertexes of black and white on the cube, a line running on the surface of the cube and connecting a plurality of vertexes of the cube, and a line running on the surface of the cube and connecting a plurality of the vertexes of the cube as well as the point of the special color. Then the cube is divided by those lines, and an interpolation process is executed on the plurality of divided solids based on grid point data of the grid points on those lines to obtain grid point data for the grid points located on other than those lines in each of the solids. Thereby even when a color other than color corresponding to the vertex of a cube in the three-dimensional color space defined by input colors such as RGB is used as a special color of a printing material, the color reproduction range of the special color can be effectively utilized. In addition, the grid point density can be made even in the uniform color space in relation with the color reproduction ranges of other colors. As a result, it is possible to perform color separation with high accuracy.

The above and other objects, effects, features and advantages of the present invention will become more apparent from the following description of embodiments thereof taken in conjunction with the accompanying drawings.

BRIEF DESCRIPTION OF THE DRAWINGS

FIGS. 17A-17D are diagrams each illustrating the relationship (table) between the identified ink quantity changing pattern for each side of a triangle and an interpolation method for the inside of the triangle;

DETAILED DESCRIPTION OF PREFERRED EMBODIMENTS

Now the embodiments of the present invention will be described in detail with reference to the accompanying drawings.

Embodiment 1

Figure 1:
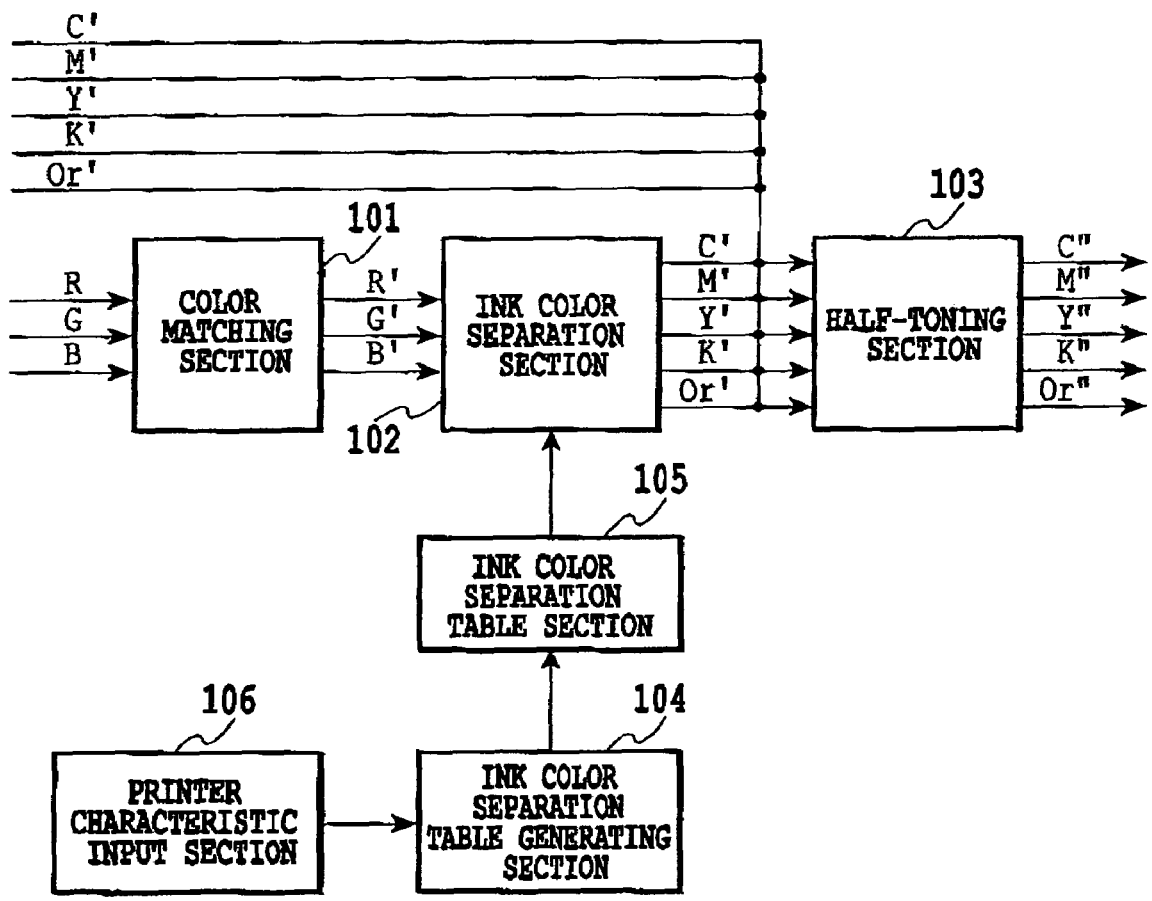
FIG. 1 is a block diagram briefly illustrating the configuration for executing color separation and generation of a color separation table used for the color separation in a printing system according to an embodiment of the invention.

FIG. 1 is a block diagram briefly illustrating the configuration for executing a color separation process and generation of a color separation table in a printing system of an embodiment of the invention.

In the figure, denoted 101 is a color matching section that matches the color reproduction property of RGB with the colors reproduced by a printer, 102 is an ink color separation section that converts R', G', B' multi-value data outputted from the color matching section into colors of printing materials C' (cyan), M' (magenta), Y' (yellow), K' (black) and a special color Or' (orange) in the printer, and 103 is a half-toning processing section that converts the C', M', Y', K' and Or' multi-value data outputted from the ink color separation section 102 into a gradation value (for example, binary value) which the printer can realize.

Denoted 105 is an ink color separation table section that provides a lookup table (LUT) to the ink color separation section 102 for using the color separation process, 104 is an ink color separation table generation section that generates an LUT for the ink color separation table section 105, and 106 is a printer property input section that provides the printer property serving as a basis for generation of the LUT by the color separation table generation section 104.

Figure 2:
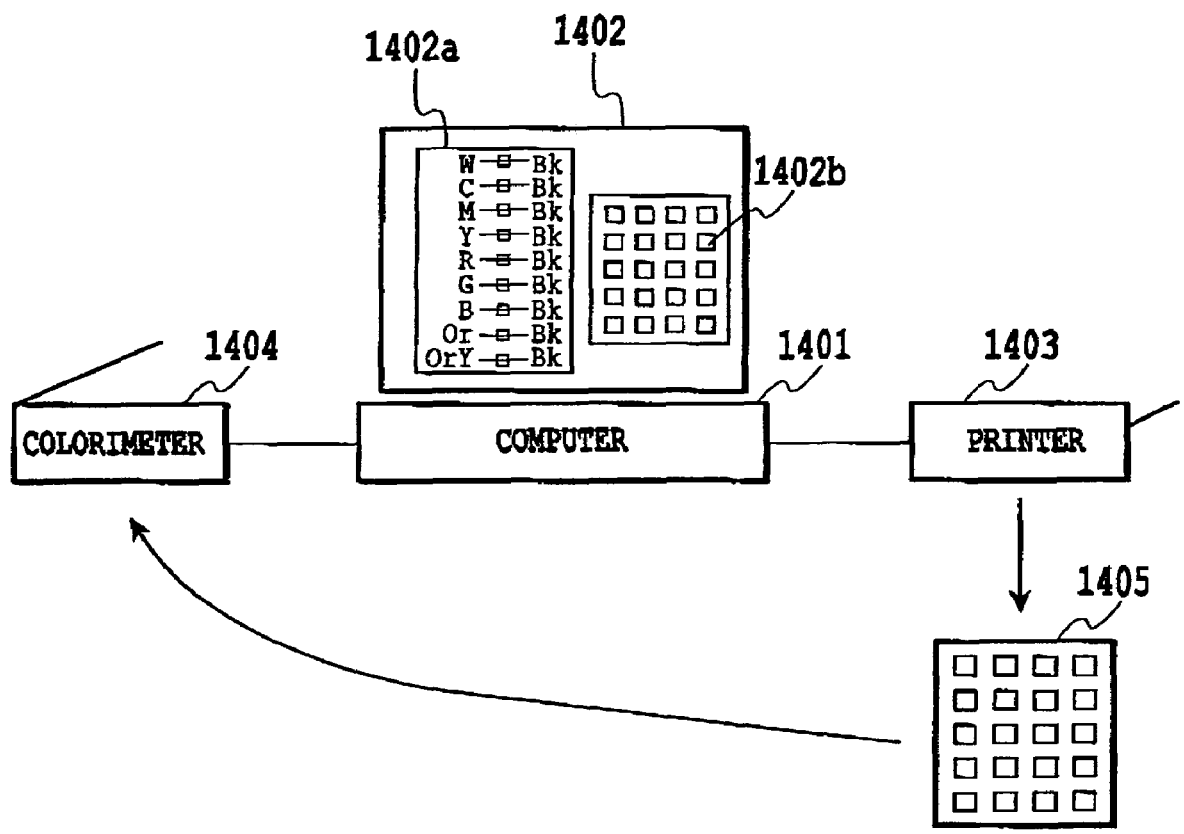
FIG. 2 is a diagram illustrating the specific configuration of the printing system shown in FIG. 1.

FIG. 2 is a diagram illustrating the specific configuration of the printing system shown in FIG. 1.

In FIG. 2, denoted 1401 is a computer such as a personal computer. The computer 1401 controls the generation of image data for a specific application and the printing process based on the image data, for the printer of the embodiment of the invention. In addition, the computer 1401 generates the color separation table, as described later, holds relevant patch data to investigate the printer property, and determines the black signal generation parameter via UIs (user interfaces) such as a monitor and a keyboard. Denoted 1402 is such a monitor that is connected to the computer 1401 and works as a UI when, for example, generating the above image data. In addition, the monitor 1402 can display a using black UI 1402a for determining a using black beginning point that will be described later and a patch pattern 1402b of the above patch data when generating a color separation table. Denoted 1403 is a color printer that performs printing in the printing system and prints a patch sample based on the above patch pattern 1402b when generating the color separation table. Denoted 1405 is the printed patch sample, and 1404 is a colorimeter that measures the optical density of the patch of the patch sample 1405.

In the above configurations the C', M', Y', K' and Or' patch data held in the computer 1401 is sent to the printer 1403 via a cable or network (not shown) for printing the patch sample with the printer 1403. The printer 1403, in response, bypasses the color matching section 101 and the ink color separation section 102 shown in FIG. 1, and sends the patch data directly to the half-toning processing section 103 to carry out only half-toning processing. Based on the patch data that has experienced the half-toning process, the printer 1403 prints the patch sample 1405.

The colorimeter 1404 measures the density of the printed patch sample 1405, and the measurement results are taken into the computer 1401. The printed patch sample 1405 is made of a plurality of patches for which gradation values are varied at predetermined number of steps, for colors of the printing material used in the printer: a primary color of C, M, Y and K, and Or which is the special color in the present embodiment, their secondary colors CM, MY, YC, CK, MK, YK, COr, MOr, YOr and KOr, third-order colors CMY, CMK, CMOr, CYK, CYOr, CKOr, MYK, MYOr, MKOr and YKOr, fourth-order colors CMYK, CMYOr, CMKOr, CYKOr and MYKOr, and fifth-order color CMYKOr.

In the configuration of the printing system shown in FIG. 2, the calorimeter 1404 constitutes the printer property input unit 106 shown in FIG. 1, while the computer 1401 (and a printer driver or an application program) constitutes the ink color separation table generation section 104. Thus the computer 1401 carries out the specific processing by the ink color separation table generation section 104 that will be explained in detail with reference to FIGS. 3A-3C and latter figures. The ink color separation table generated by the computer 1401 is downloaded to the ink color separation table section 105 in the printer 1403 via a cable or network (not shown). In other words, the color matching section 101, ink color separating section 102, half-toning processing section 103 and ink color separation table section 105 shown in FIG. 1 are configured in the printer 1403.

The application of the present invention is not limited to the above example. In fact, the computer 1401 may execute the image processing using the color separation table, and the data that has experienced the half-toning processing may be sent to the printer 1403.

Now the image processing executed by the printer 1403 for usual printing, which uses the ink separation table, will be briefly described below.

First referring to FIG. 1, the color matching section 101 executes color matching process on the RGB multi-value color image data so that the color reproduction range of the monitor 1402 matches with that of the printer 1403. The R'G'B' data that has experienced the color matching process is converted by the ink color separation section 102 into printing material colors or ink color signals C'M'Y'K'Or' by using the LUT that is a color separation table, which is previously generated and provided by the ink separation table section 105. It is well known that this conversion is performed basically by an interpolation process using the grid point data of the LUT. The C'M'Y'K'Or' multi-value data obtained by using the color separation table is converted into gradation values realized by the printer 1403 in the half-toning processing section 103, and then, based on the gradation values printing an image is performed.

Next described are the details of the generation of a color separation table in the present embodiment.

Figure 3A:
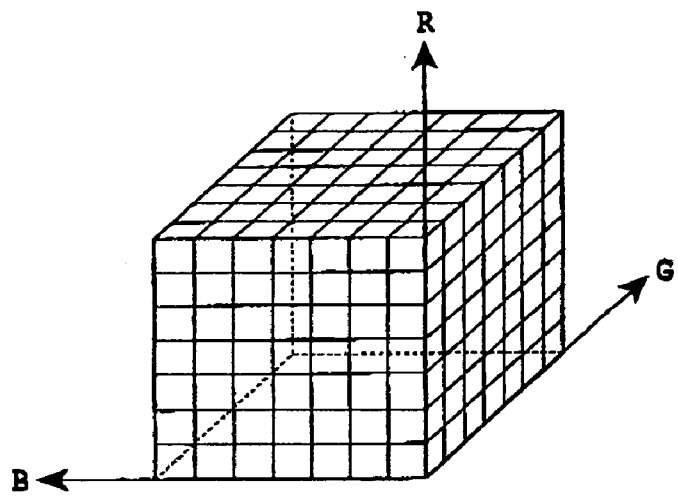
FIG. 3A is a diagram schematically illustrating the structure of a color separation table.

FIG. 3A is a diagram schematically illustrating the structure of a color separation table. As shown in this figure, the color separation table is configured such that grid points are defined in a three-dimensional space by color signals R', G' and B' each having a plurality of signal levels, and corresponding to respective grid points, combinations (C'M'Y'K'Or') of signals of the cyan, magenta, yellow, black and orange inks that are printing materials of the present embodiment are stored. In the present embodiment, each of the color signals R'G'B' has 256 (8 bits) signal levels. Thus the color separation table is defined as a cube having $256^3$ grid points.

Figure 3B:
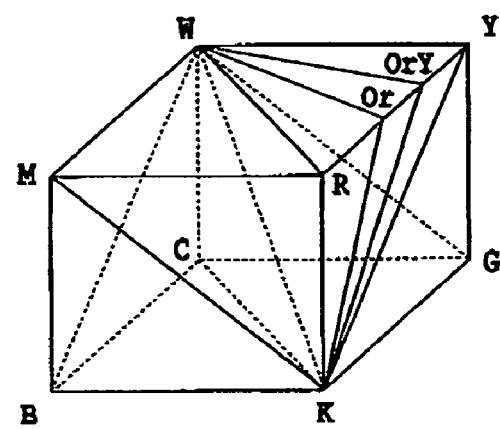
FIG. 3B is a diagram illustrating lines formed by grid points of which grid point data is predetermined when generating the color separation table.

As well known, in the case that the combination of input color signals R'G'B' does not have a corresponding LUT grid point in the ink color separation table section 105 when the ink color separating section 102 uses the above table, the data of neighboring grid points is used for interpolation, and the interpolation result is outputted as a color signal C'M'Y'K'Or'. Many interpolation techniques such as the tetrahedral interpolation and cubic interpolation are known. The ink color separation table generation method of the invention or image processing using such a table does not depend on a specific interpolation technique but may use various interpolation techniques, FIG. 3B is a diagram illustrating lines formed by grid points of which grid point data is first determined upon generation of the color separation table. These are the lines extending from vertex W to vertex K through vertexes C, M, Y, R, G, B, Or and OrY respectively, with such ten vertexes W, C, M, Y, R, G, B, Or, OrY and K being determined in the cube shown in FIG. 3A, and extending such that the line connects vertex W and vertex K. These lines are expressed with solid or dotted lines in FIG. 3B. In these lines, the line W-Or-K is what corresponds to orange (Or) used by the printer 1403 as the ink of the special color, while the line W-OrY-K is what corresponds to a secondary color made from this orange and the yellow ink similarly used by the printer 1403. In other words, when a special color other than colors corresponding to the vertexes of the cube is used as a printing material color, namely, as a primary color, the present embodiment of the invention sets a corresponding grid point on a side connecting two vertexes Then, by determining in advance the grid point data for the line including such a grid point based on the color measurement results, it becomes possible to generate the color separation table of a uniform grid point density in the uniform color space even when a special color other than red, green and blue is used.

In this case, setting of the grid point for the special color (hereinafter, also called special color control point) between two vertexes is executed based on the color measurement result on the patch sample 1405. Specifically, the grid point data of grid point Y=(255, 255, 0), which is the vertex of the cube, is previously determined as (C, M, Y, K, Or)=(0, 0, 255, 0, 0). Similarly, the grid point data of grid point R=(255, 0, 0) is previously determined as (C, M, Y, K, Or)=(0, 255, 255, 0, 0). The color measurement value of each of two patches, which are printed based on the above two grid point data respectively, is obtained Then, based on these color measurement values, the grid points on the line connecting the vertexes Y and Ra are defined so that these grid points are distributed evenly in the uniform color space. Further, the grid point (coordinate (R, G, B)) having the nearest measurement value to the measurement value for the patch of (C, M, Y, K, Or)=(0, 0, 0, 0, 255) in a measurement space, among the defined grid points, is determined as the special color control point. In addition, the grid point data of the special color control point is determined as (C, M, Y, K, Or)=(0, 0, 0, 0, 255).

The grid point on the above mentioned nine lines and the grid point data thereof are determined similarly to determination for the special color control point during table generation before an interpolation process for determining grid point data inside the cube. Specifically, the measurement value of the patch, which is printed based on the gird point data for each of two vertexes on the line, is obtained. Based on these measurement values, the grid points on the line connecting the two vertexes are defined so that these grid points are distributed evenly in the uniform color space. Then, the grid points in the measurement space are made correspond to respective coordinates (R, G, B) and the grid point data (C, M, Y, K, Or) for each of the coordinates is obtained as the data for patch of the nearest measurement value to the measurement value of that grid point.

The coordinates of individual vertexes C, M, Y, R, G, B, Or, OrY and K in the cube, in which the color signals R'G'B' are 8-bit data, are given below.

W=(255, 255, 255), indicating white of the third-order color, namely, the color of the printing paper.
C=(0, 255, 255), indicating cyan of the primary color.
M=(255, 0, 255), indicating magenta of the primary color.
Y=(255, 255, 0), indicating yellow of the primary color.
R=(255, 0, 0), indicating red of the secondary color.
G=(0, 255, 0), indicating green of the secondary color.
B=(0, 0, 255), indicating blue of the secondary color.
Or=(255, 128, 0; in the case that the special color control point is the mid point between Y and R), indicating orange of the primary color, which is the special color.
OrY=(255, 192, 0), indicating orange-yellow of the secondary color.
K=(0, 0, 0) , indicating black of the primary black, namely, the darkest color the printer realizes.

As described above, if the orange color, used as the special color in the present embodiment, is an intermediate color between red and yellow, the grid point of Or=(255, 128, 0), which corresponds to an intermediate point between red and yellow in the RGB coordinate system of the color separation table, is set as a primary orange color. It is of course possible to set the special color control point between red (255, 255, 0) and yellow (255, 0, 0), corresponding to the color reproduction property of the special color; for example, when the special color is close to red, the control point is set to a point close to R=(255, 0, 0), while a point close to Y=(255, 255, 0) if it is close to yellow. Likewise, OrY can be located at any grid point between the special color control point of Or and the special color control point of Y, corresponding to the color reproduction property of each special color.

According to the color separation table generation method of the present embodiment, after a using black beginning point is determined on each of the lines extending from vertex W to vertex K via individual vertexes C, M, Y, R, G, B, Or and OrY and the line connecting vertex W and vertex Bk, generation of the color separation table is performed. Specifically, grid point data (ink quantity of each of C, M, Y, K and Or ink) for each grid point is set on each line for which the using black beginning point has been already determined. Later, the ink quantity of each color corresponding to the grid points other than those on the above lines is determined by interpolation in each tetrahedron which is obtained by dividing the cube into eight.

Figure 3C:
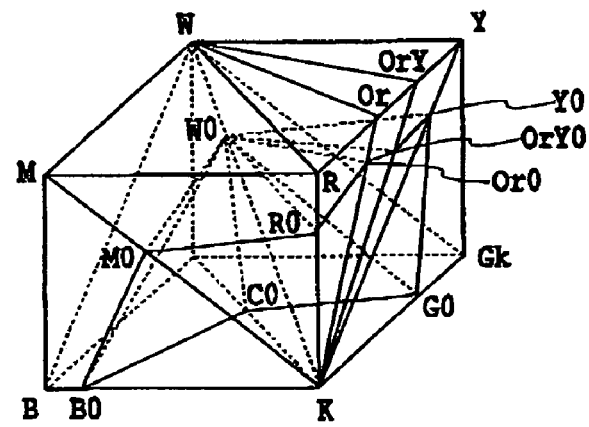
FIG. 3C is a diagram illustrating a using black beginning point on each line according to the embodiment of FIG. 3B.

FIG. 3C is a diagram illustrating the using black beginning point on each line in the embodiment shown in FIG. 3B. The using black beginning point is the point where black ink (K ink) begins to be used for color separation. Specifically, the quantity of the K ink in addition to C, M, Y and Or inks is determined for the grid points between the determined using black beginning point and vertex K in each line of the color separation table.

Setting the using black beginning points in the embodiment is made by that the operator or user determines respective using black beginning points C0, M0, Y0, R0, G0, B0, W0, Or0 and OrY0 on the nine lines connecting vertex W and vertex K via each of vertexes C, M, Y, R, G, B, Or and OrY and on the line connecting vertex W and vertex K, through the using black UI 1402a described in FIG. 2. If the operator or user makes point settings considering the color restoring region and granular impression by black ink for each line as well as the influence of the settings of a line upon the color reproduction range in another line, it becomes possible to set the using black beginning points continuously in the three-dimensional color space that will be reproduced by the inks.

Figure 4:
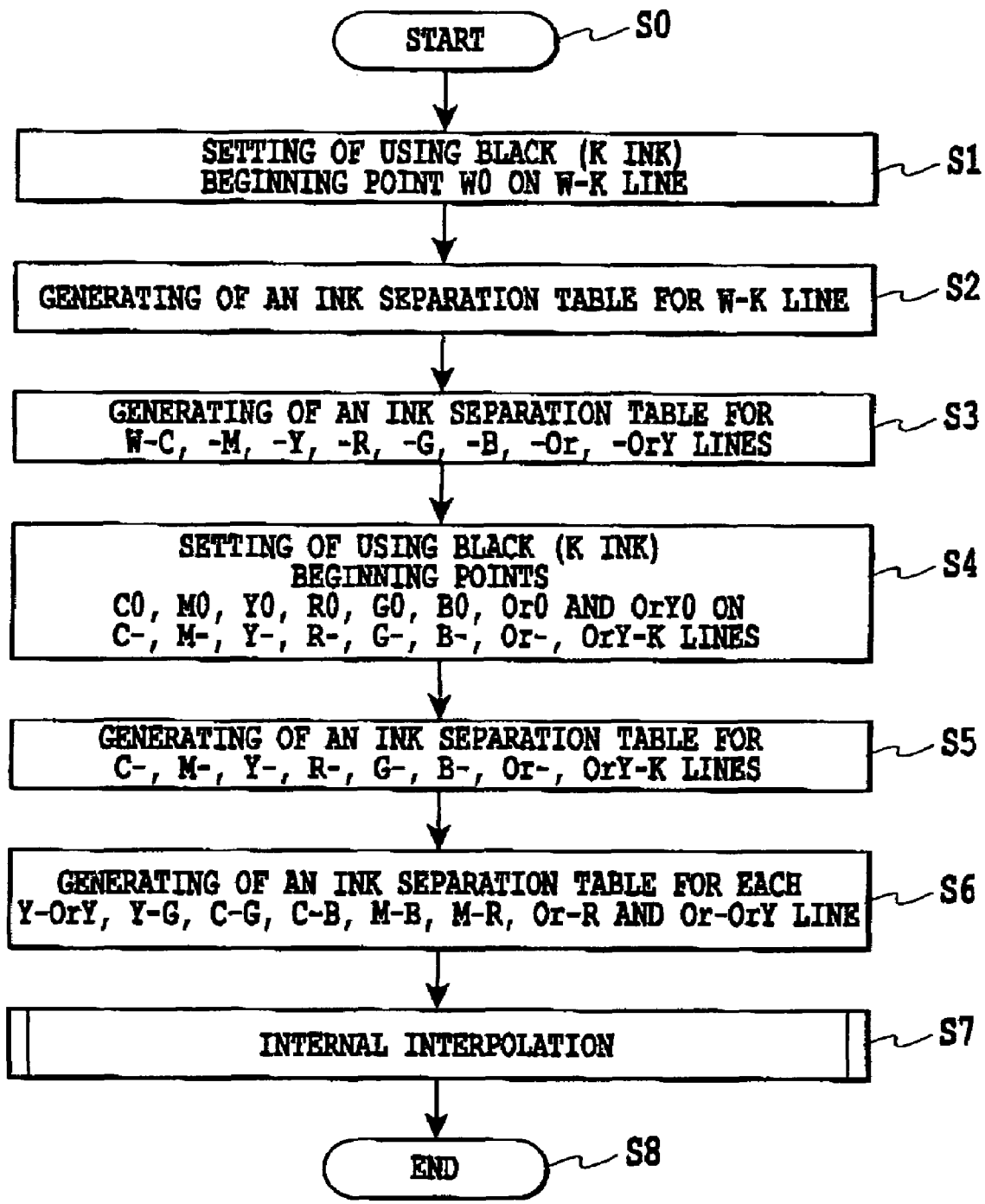
FIG. 4 is a flowchart of the color separation table generating process according to an embodiment of the invention.

FIG. 4 is a flowchart for generating the color separation table.

In the figure, step S0 is a start step at which generation of a table to be downloaded to the ink color separation table section 105 is started.

Step S1 is a step for setting the using black beginning point W0 on the W-K line shown in FIG. 3C. As described above, the using black beginning point W0 on the line connecting white (W) and black (K) is set by the operator or user according to the settings inputted with a using black UI 1402a.

Next step S2 is a step for generating a color separation table for the W-K line (gray line) based on the using black beginning point W0 determined at step S1.

Specifically, as described earlier in FIG. 3B, the ink quantity (C, M, Y, K, Or) of each color which is grid point data corresponding to each (R, G, B) that defines each grid point on the W-K line, is determined by using the aforementioned inverse conversion relation provided from the color measurement on the patch sample 1405. In relation with the using black beginning points, the inverse conversion relates one combination (R, G, B) to a combination (C, M, Y, K, Or) including K and a combination (C, M, Y, Or) not including K. Thus a combination not including K is set as grid point data for a grid point not using K, while a combination including K is set as grid point data for a grid point using K.

Step S3 is a step by which a color separation table for the lines connecting vertex W and each of C, M, Y, R, G, B, Or and OrY. Namely, a color separation table is generated for each line connecting white and a primary color (C, M, Y, Or) corresponding to an ink color and for each line connecting white and a secondary color (R, G, B, OrY) that is expressed by two ink colors, specifically, W-C, W-M, W-Y, W-R, W-G, W-B, W-Or and W-OrY. This process is carried out in the basically same manner as that described in step S2.

Step S4 is a step for setting using black(K ink) beginning points C0, M0, Y0, R0, G0, B0, Or0 and OrY0 on the nine lines connecting K and each of C, M, Y, R, G. B. Or and OrY shown in FIG. 3C. Corresponding to the settings provided via the using black UI 1402a, the using black (K ink) beginning points C0, M0, Y0, R0, G0, B0, Or0 and OrY0 on each of C-K, M-K, Y-K, R-K, G-K, B-K, Or-K and or Y-K lines are determined. Step S5 is a step for generating a color separation table for each of the lines connecting K and C, M, Y, R, G, B, Or or OrY. The color separation table is generated in the basically same manner as steps S2 and S3.

Step S6 is a step that generates a color separation table for each of the lines Y-OrY, Y-G, C-G, C-B, M-B, M-R, Or-R and Or-OrY. This step is carried out in the basically same manner as steps S2, S3 and S5.

After the color separation table for determining grid point data on each side of the divided tetrahedrons is generated, an internal interpolation process is executed at step S7 to determine grid point data for locations other than the sides of the tetrahedrons. Specifically, the color separation table of the inner space is generated for determining, by an interpolation process, the ink quantity of each grid point inside the triangles formed by the above lines and inside the tetrahedrons formed by those triangles.

Now the internal interpolation process of step S7 is described in detail below.

Figure 5:
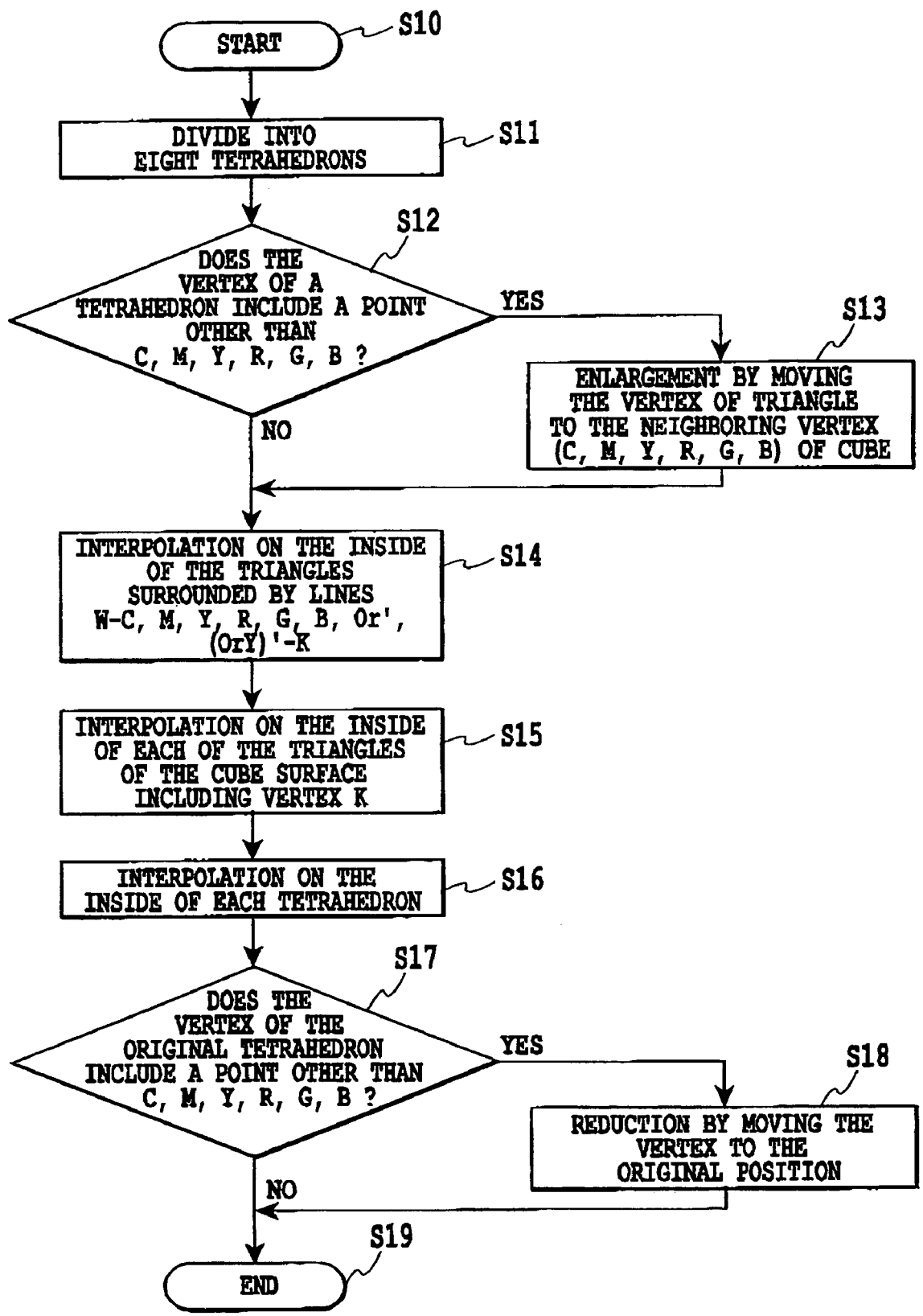
FIG. 5 is a flowchart illustrating the specific procedure of the internal interpolation process shown in FIG. 4.

FIG. 5 is a flowchart illustrating the specific procedure of the internal interpolation process of step S7.

In FIG. 5, step S10 is a start step in which a predetermined process is executed to start the following steps. Step S11 is a step by which the cube forming a color separation table is divided into eight tetrahedrons. The color space (the cube) shown in FIG. 3B is divided into eight tetrahedrons. This division is carried out by a calculation of R, G, B coordinate data in the present embodiment. FIGS. 6A-6H show the tetrahedrons produced by such division.

Figure 6A:
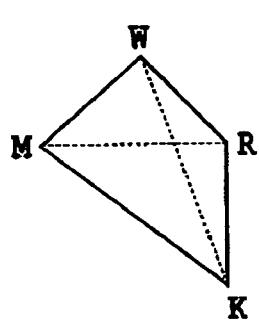
FIGS. 6A-6H are diagrams illustrating respective tetrahedrons formed by dividing the color space (the cube) shown in FIG. 3B into eight.
Figure 6B:
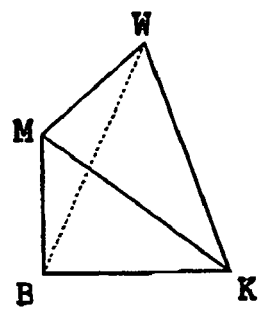
Figure 6C:
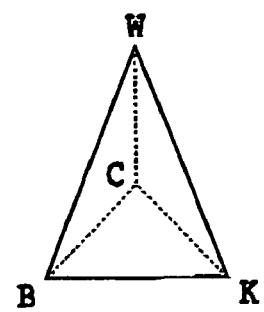
Figure 6D:
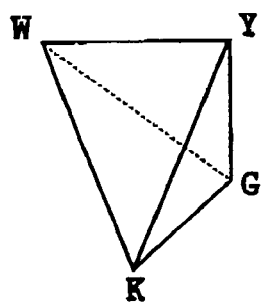
Figure 6E:
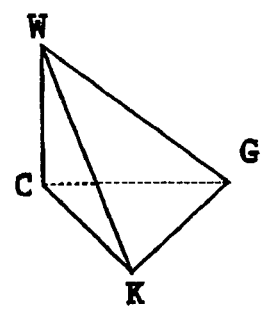
Figure 6F:
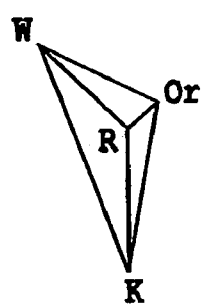
Figure 6G:
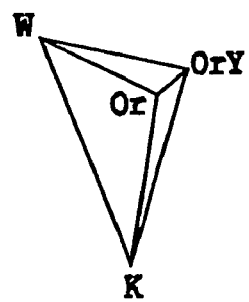
Figure 6H:
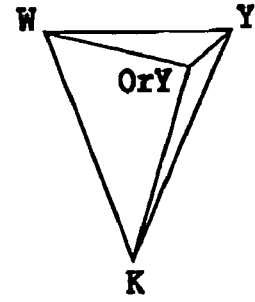

FIG. 6A shows a tetrahedron having vertexes W, R, M and K; FIG. 6B shows a tetrahedron having vertexes W, M, B and K; FIG. 6C shows a tetrahedron having vertexes W, C, B and K; FIG. 6D shows a tetrahedron having vertexes W, Y, G and K; FIG. 6E shows a tetrahedron having vertexes W, C, G and K; FIG. 6F shows a tetrahedron having vertexes W, R, Or and K; FIG. 6G shows a tetrahedron having vertexes W, Or, OrY and K; and FIG. 6H shows a tetrahedron having vertexes W, OrY, Y and K.

Next, step S12 decides whether each of these tetrahedrons has a vertex other than the vertexes C, M, Y, R, G and B. In other words, this step decides whether a tetrahedron has the vertexes related by the special color Or When the tetrahedron has the vertexes related by the special color Or, the tetrahedron is enlarged at step S13 and then the step proceeds to step S14. Otherwise, the process moves directly to step S14. Specifically, when the tetrahedron is one of the three tetrahedrons W-R-Or-K, W-Or-OrY-K and W-OrY-Y-K shown in FIGS. 6F, 6G and 6H, the process proceeds to step S13 for enlargement. Otherwise, the process proceeds to step S14.

Enlarging process in step S13 enlarges the target tetrahedron such that the vertexes (grid points), which are not any of the eight vertexes of the cube, are moved to the closest vertex of the cube. By this enlargement, the target tetrahedron becomes the same tetrahedron as the tetrahedron having four vertexes among the vertexes of the cube. There is difference in that the grid points on the line among sides (lines) forming the target tetrahedron, which changes its length by such enlargement, move linearly at an enlargement rate to grid points on new elongated line, but the grid point data (ink quantity of each color) at each grid point does not change from the original value. The new grid points and grid point data on the elongated line of the enlarged tetrahedron are thus determined in this way, and the grid point data inside this enlarged tetrahedron is the same as that in the above tetrahedron having four vertexes among the vertexes of the cube.

Figure 7A:
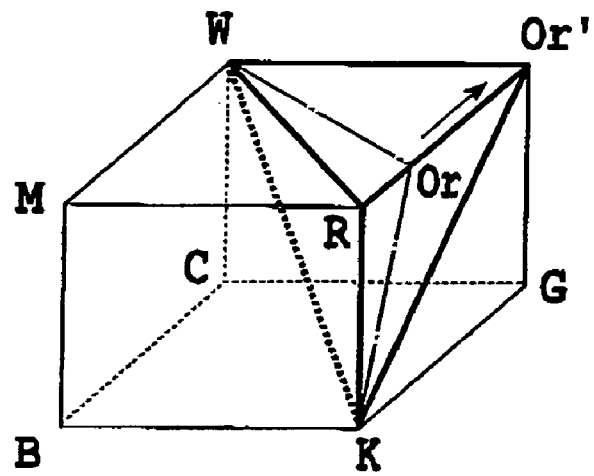
FIGS. 7A and 7B are diagrams illustrating the enlargement and reduction processes of the tetrahedron including a special color, in an embodiment of the invention.
Figure 8A:
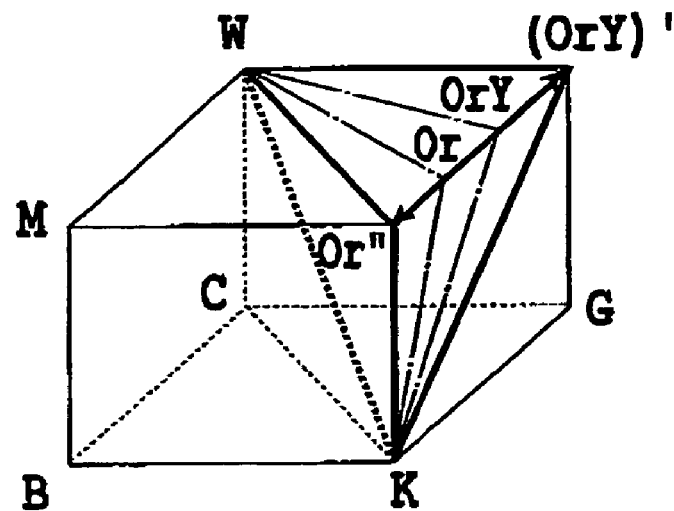
FIGS. 8A and 8B are diagrams similarly illustrating the enlargement and reduction processes of the tetrahedron including a special color, in an embodiment of the invention.
Figure 9A:
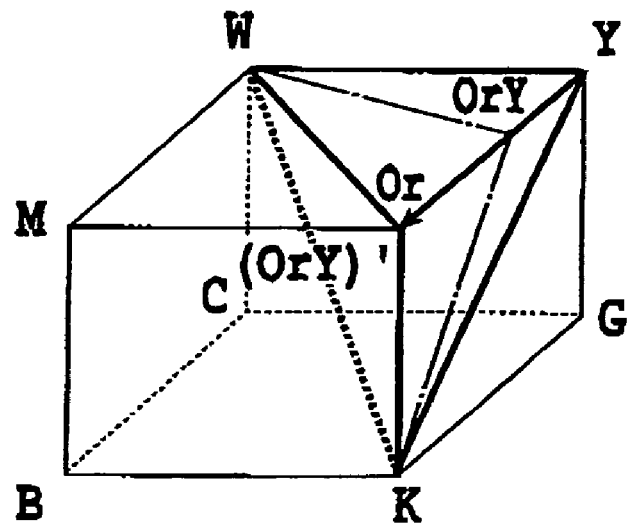
FIGS. 9A and 9B are diagrams similarly illustrating the enlargement and reduction process of the tetrahedron including a special color, in an embodiment of the invention.

FIGS. 7A, 8A and 9A are diagrams illustrating the enlargement process for the individual tetrahedron of the embodiment. Specifically, these figures respectively illustrate the enlargement of three tetrahedrons W-R-Or-K, W-Or-OrY-K and W-OrY-Y-K shown on FIGS. 6F, 6G and 6H, where vertex Or and vertex OrY are each moved to a neighboring vertex of the cube for enlargement.

As shown in FIG. 7A, vertex Or of tetrahedron W-R-Or-K, Or not being any vertex of the cube, is moved to the vertex Y to be Or' to enlarge tetrahedron W-R-Or-K to tetrahedron W-R-Or'-K. Specifically, the grid points on line W-Or and line Or-K are moved in parallel to a side R-Or(Y) so that they have grid point coordinates on a side W-Or' (Y) and a side Or' (Y)-K. In this case, the grid point data of each grid point does not change. Likewise, the grid points inside tetrahedron W-R-Or'-K are the same as those inside tetrahedron W-R-Y-K sharing four vertexes of the cube. Such grid point data is calculated by internal interpolation at following steps S14, S15 and S16.

The enlargement processes shown in FIGS. 8A and 9A are carried out in the basically same manner as above. Specifically, with respect to vertex Or and vertex OrY of tetrahedron W-Or-OrY-K shown in FIG. 8A, vertex Or is moved to vertex R to be vertex Or' and vertex OrY is moved to vertex Y to be (OrY)' to enlarge tetrahedron W-Or-OrY-K to tetrahedron W-Or'-(OrY)'-K. In this case, the enlargement process is done by moving two vertexes. Meanwhile, as shown in FIG. 9A, vertex OrY of tetrahedron W-OrY-Y-K is moved to vertex R to be (OrY)' to enlarge tetrahedron W-OrY-Y-K into tetrahedron W-(OrY)'-Y-K.

Next at steps S14, S15 and S16, the tetrahedrons obtained by division and enlarged tetrahedrons are exposed to an internal interpolation to determine the grid point data (ink quantity of each color) for the grid points existing in other than the sides of each tetrahedron.

First, at step S14, the grid point data for each of the grid points inside each of the triangles forming a tetrahedron, such triangles being formed by line W-K and other two lines, is determined by interpolation. The interpolation process for the grid points inside the triangle will be described with reference to FIG. 11 and latter figures.

Likewise, at step S15, the grid point data for each grid point inside each of the triangles forming the surface of the cube having vertex K is determined by interpolation. Specifically, interpolation is conducted for the grid points inside eight triangles having vertex K, namely, K-R-Or, K-G-Y, K-R-M, K-B-M, K-G-C, K-B-C, K-Or-OrY and K-OrY-Y, to determine grid point data. This interpolation process is basically the same as that done at S14 and will be described later.

Figure 10:
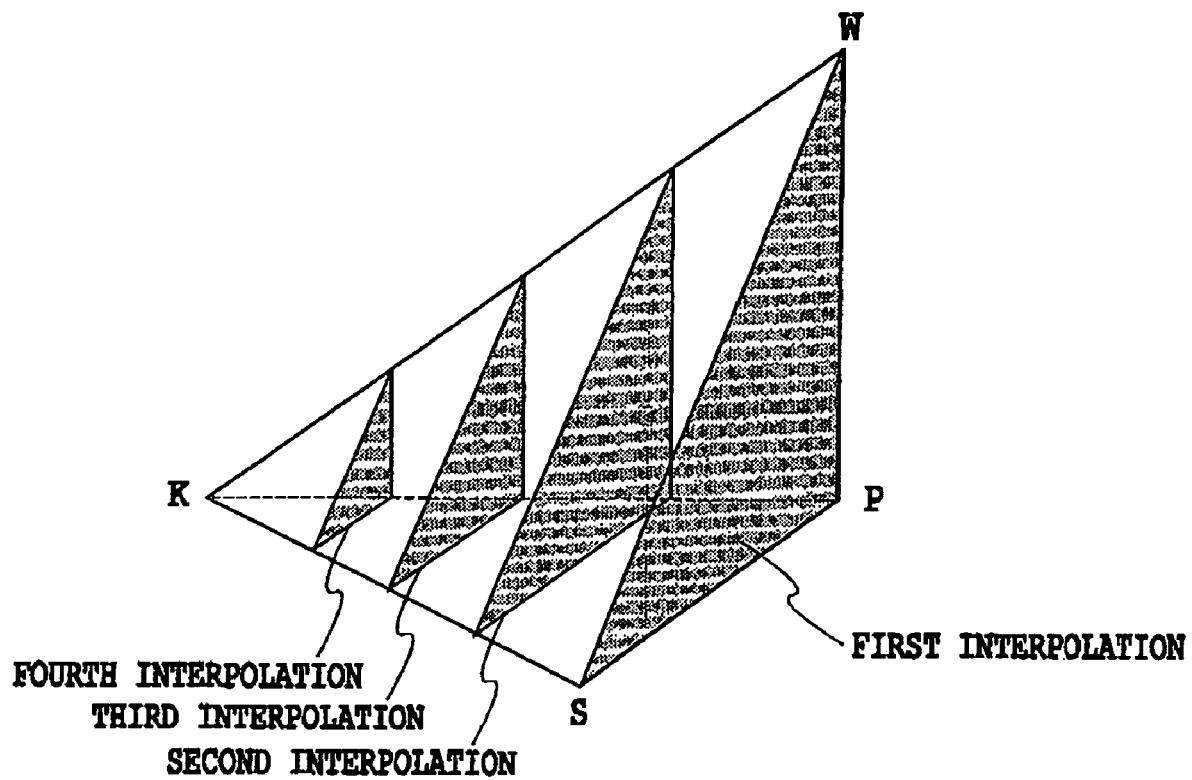
FIG. 10 is a diagram illustrating the sequence of interpolation for a triangle in the inside of a tetrahedron, in an embodiment of the invention.

At last, at step S16, interpolation is conducted for the grid points existing inside each tetrahedron (not on the surface) to determine the grid point data. For this interpolation, firstly as shown in FIG. 10, interpolation is made on grid points in the triangle not including K (triangle having vertexes W, P and S) in the tetrahedron having vertexes W, P, S and K (P and S are two of C, M, Y, R, G, B, Or and OrY), and then interpolation is conducted for the triangle one grid inside in parallel toward K one after another The interpolation process of this step is basically the same as interpolation for the inside of a triangle of steps S14 and S15, and will be specifically described later.

After the internal interpolation is over, the same decision as that done at step S12 is made at step S17 for each tetrahedron. Namely, the tetrahedron which has been exposed to the enlargement of step S13 is identified so that this enlarged tetrahedron is reduced at step S18.

The reduction process of step S18 is a process to move the grid points on the elongated line to their original positions on the pre-elongated line linearly (in parallel) in the reverse direction of the enlargement, and the internal grid points other than that on the elongated line are moved as well in parallel. In this case, the grid point data of each grid point does not change. In addition, after the grid points are moved, the grid point data is determined for each internal grid point that existed in the original tetrahedron, based on the grid point data of the moved grid points. The grid points moved by such reduction are located at reduced positions in the cube, which do not correspond to the original positions in the original tetrahedron. Thus the grid point data for each of the original grid points in the original tetrahedron is calculated by interpolation using some grid points moved to its neighborhood. This interpolation can use a publicly known technique.

Figure 7B:
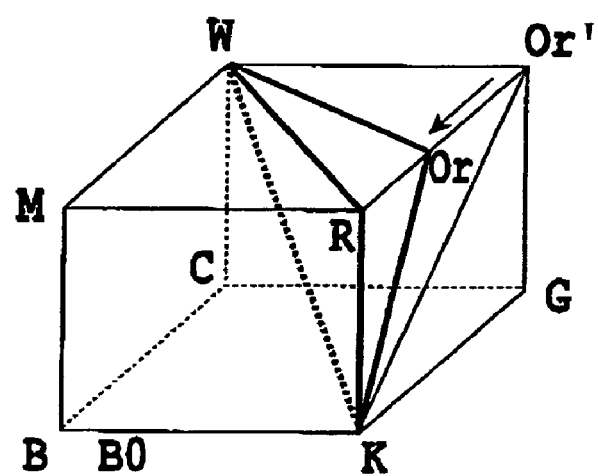
Figure 8B:
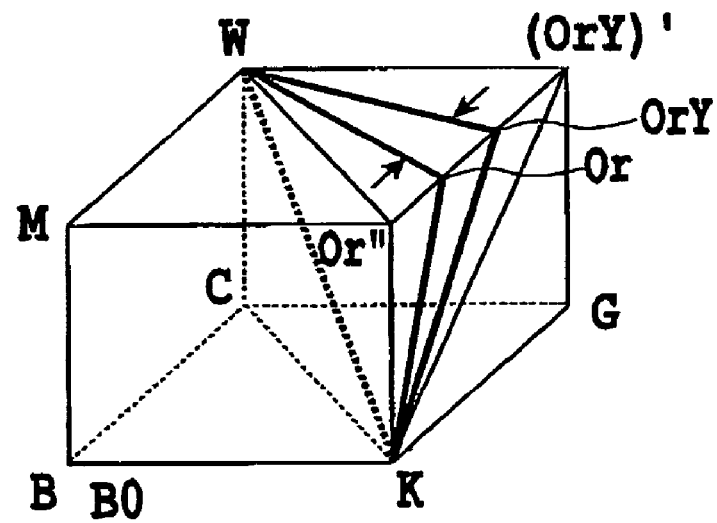
Figure 9B:
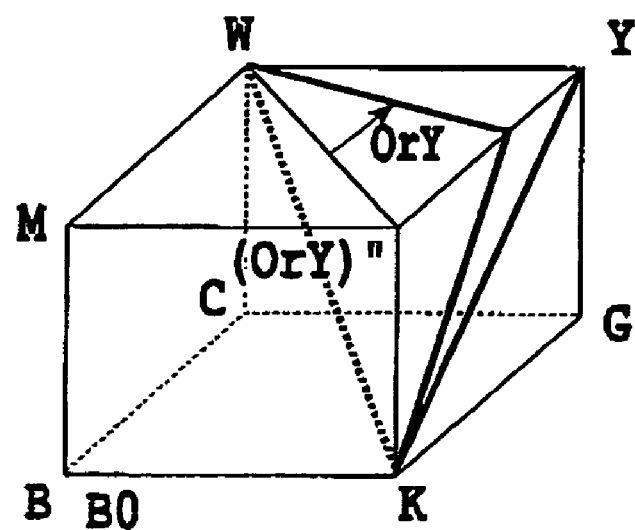

FIGS. 7B, 8B and 9B are diagrams illustrating the reduction process for the tetrahedrons of the embodiment, and each diagram shows the tetrahedron reducing process that moves vertex Or' and vertex (OrY)' to original positions, in contrast to the enlargement process shown in FIGS. 7A, 8A and 9A.

As shown in FIG. 7B, with respect to the enlarged tetrahedron W-R-Or'-K, vertex Or' moved to vertex Y as shown in FIG. 7A is returned to its original position Or. Then tetrahedron W-R-Or'-K is reduced to the original tetrahedron W-R-Or-K. Then, as described above, the grid point data for the points on the line and inside the tetrahedron does not change, but the grid data (ink quantity) for each grid point inside the original tetrahedron W-R-Or-K is determined by such interpolation.

FIG. 8B illustrates the reduction process for tetrahedron W-Or'-(OrY)'-K, where vertex Or' is moved to its original position, Or, and vertex (OrY)' is moved to its original position, OrY. As a result, tetrahedron W-Or'-(OrY)'-K is reduced to the original tetrahedron W-Or-OrY-K. FIG. 9B is a diagram illustrating the reduction process for tetrahedron W-(OrY)'-Y-K, where vertex (OrY)' is moved to its original position, OrY. As a result, tetrahedron W-(OrY)'-Y-K is reduced to the original tetrahedron W-OxY-Y-K. In the above reduction, as is the case with FIG. 7B, the grid point data for the grid points on the line and inside the tetrahedron does not change. By an interpolation using such data, the grid point data (ink quantity) for each grid point inside each original tetrahedron is determined.

Step S19 is the end step at which the internal interpolation of step S7 shown in FIG. 4 is completed.

By the above described enlargement and reduction processes, even when a special color such as orange, which is not an appropriate color that should not be placed on the vertex of the cube for generation of a color separation table, is used as a printing material color, the interpolation for the inside of a tetrahedron having a vertex corresponding to the special color for the generation of the table can be executed with the same algorithm as that employed in interpolation for the inside of a tetrahedron not having the special color in its vertex. In addition, such enlargement and reduction processes can simplify the interpolation process for the inside of a tetrahedron having the special color in its vertex, compared with the case using no enlargement.

Interpolation for the Inside of a Triangle

Now the interpolation process of FIG. 5 for the inside of each of the triangles of steps S14, S15 and S16 is described in detail with reference to FIGS. 11A-24C.

Figure 11:
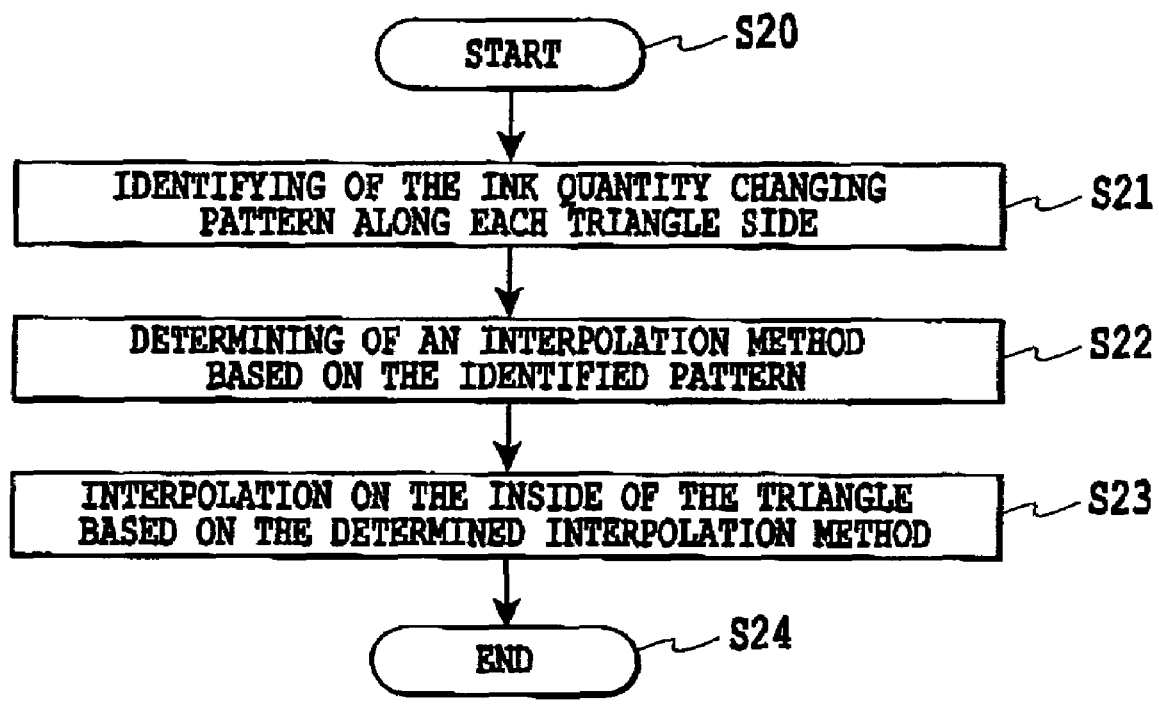
FIG. 11 is a flowchart illustrating the procedure of interpolation for the inside of a triangle, in an embodiment of the invention.

FIG. 11 is a flowchart illustrating the interpolation process for the inside of a triangle. Specifically, the figure shows how to determine by interpolation the ink quantity data of each ink (grid point data) for each grid point inside a triangle, the data being stored in the ink color separation table. Although one ink color is taken as an example for the explanation of interpolation here, this interpolation is made on all C, M, Y, K and Or inks.

Step S21 decides what changing pattern the ink quantity, which is grid point data on each side of the triangle, changes.

Figure 12:
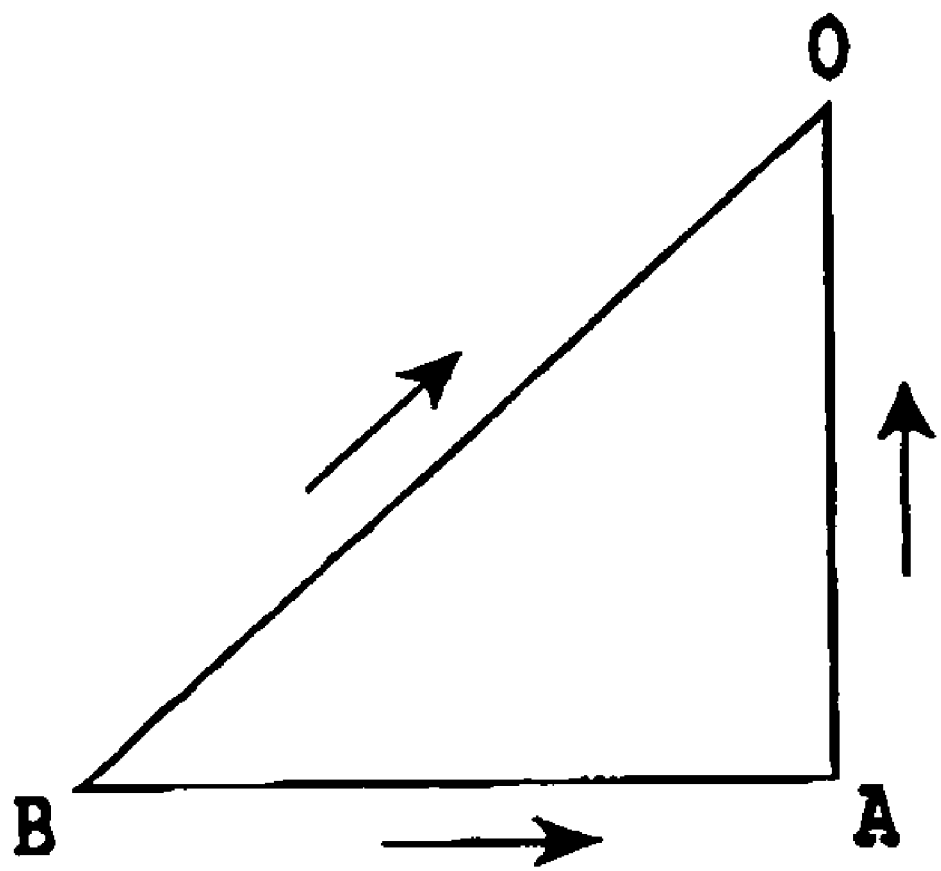
FIG. 12 is a diagram indicating the direction of identifying the ink quantity changing pattern along each side of a triangle in the above interpolation for the inside of a triangle.

In the embodiment, the ink quantity changing pattern is decided to be "constant", "monotone increase", "monotone decrease" or "convex". This decision of the ink quantity changing pattern on each side is made in the direction from start point B to end point O, with start point B and end point O being fixed in triangle O-B-A as shown in FIG. 12. In any changing pattern, four control points P1-P4 are set for the grid points of each side. Note that in the following description the triangle used for interpolation is expressed as O-B-A as shown in FIG. 12.

Of these control points P1-P4 set on a side depending on each ink quantity changing pattern along the side, P1 is the slope initiating point, P2 is the maximum ink quantity initiating point, P3 is the maximum ink quantity ending point, and P4 is the slope ending point. In the present embodiment, interpolation is conducted with reference to those control points P1-P4.

Figure 13A:
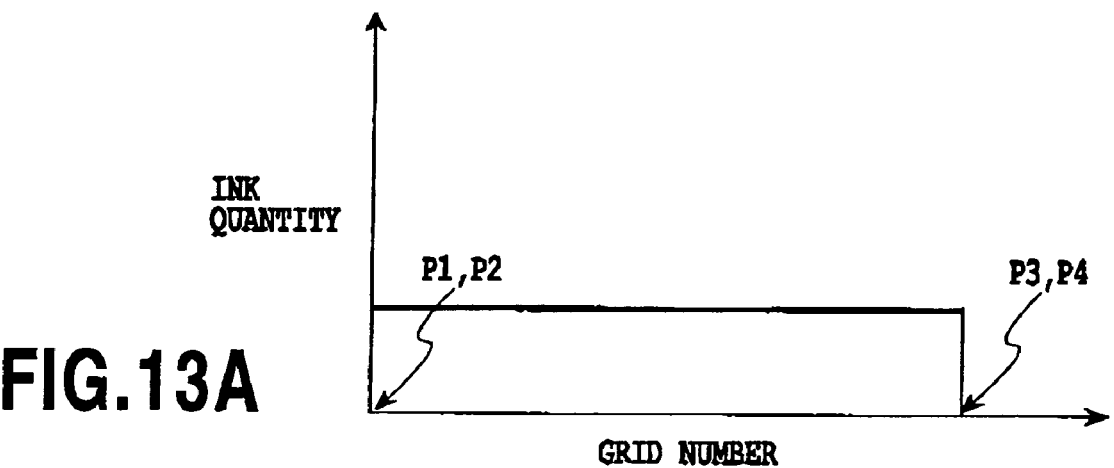
FIGS. 13A and 13B are diagrams illustrating examples of setting control points P1-P4 when the ink quantity changing pattern is "constant"
Figure 13B:
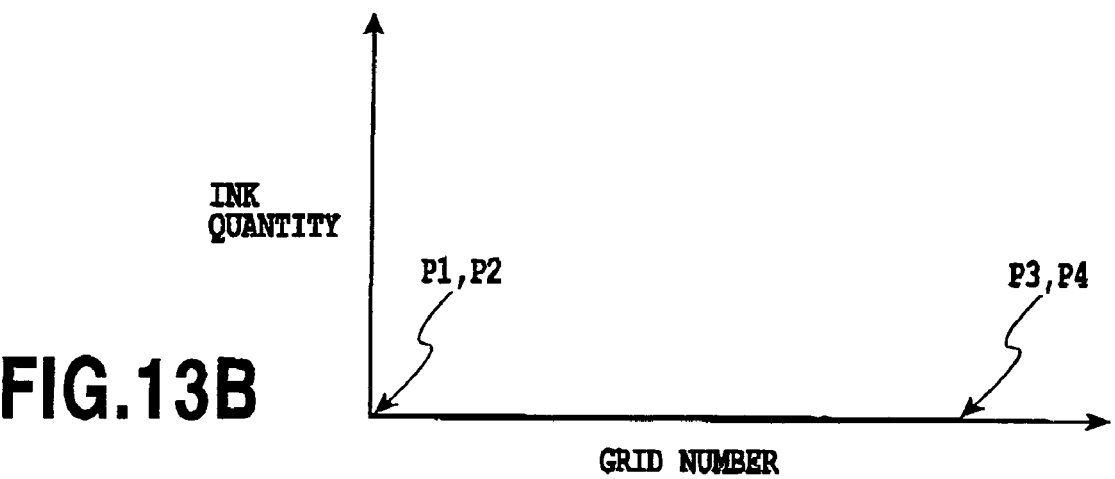

FIGS. 13A and 13B are diagrams illustrating two cases where the ink quantity changing pattern is "constant" on the side. Note that, although in those figures the ink quantity is expressed as a continuous line with respect to grid point numbers for the purpose of simplicity, the real ink quantity should be plotted discretely with respect to grid numbers. When the changing pattern is "constant", control points P1 and P2 are set to the left end, while control points P3 and P4 are set to the right end.

Figure 14A:
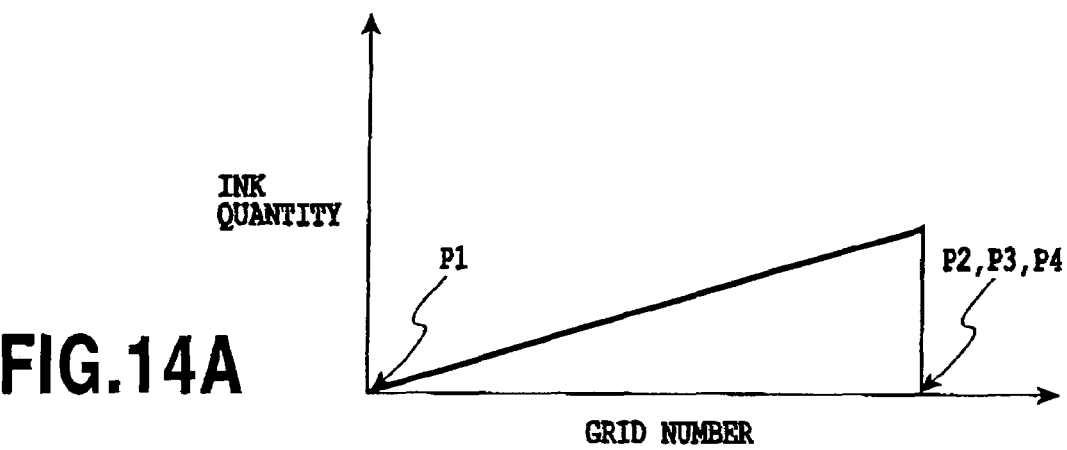
FIGS. 14A and 14B are diagrams illustrating examples of setting control points P1-P4 when the ink quantity changing pattern is "monotone increase"
Figure 14B:
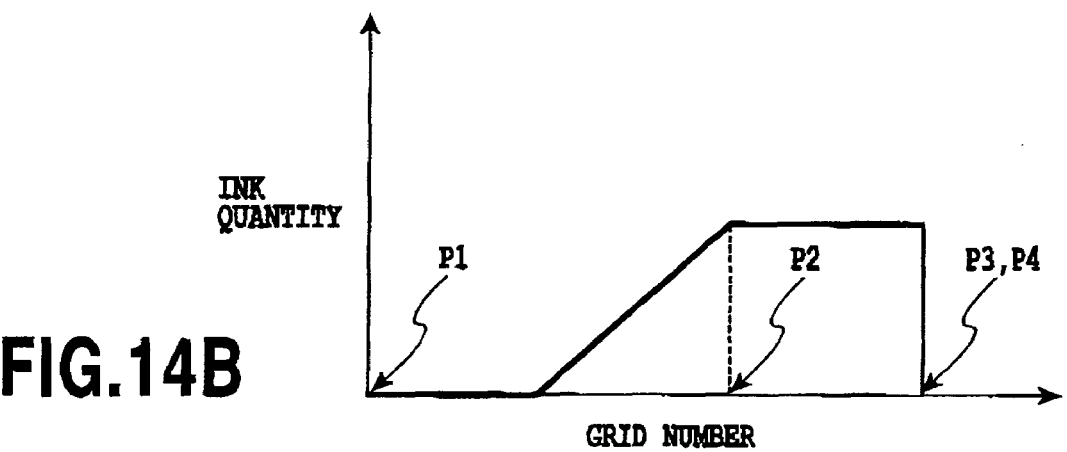
Figure 15A:
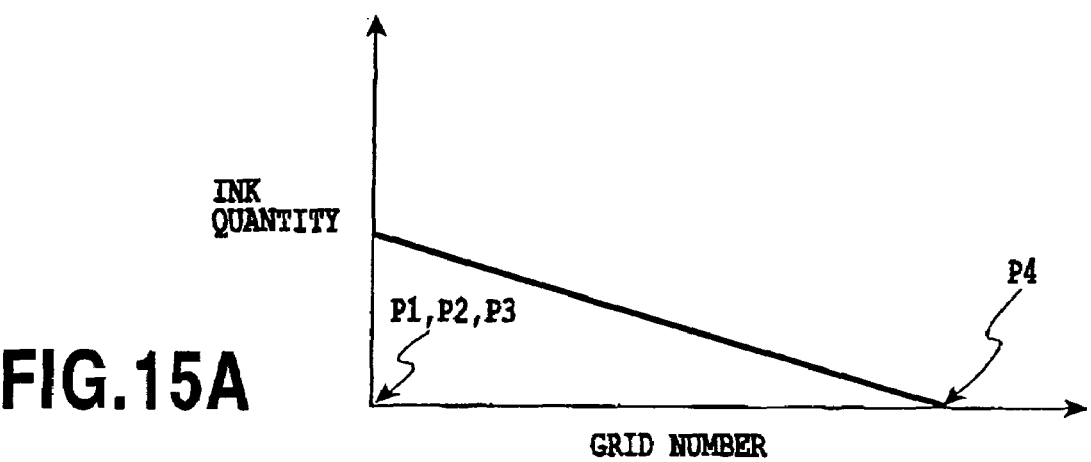
FIGS. 15A and 15B are diagrams illustrating examples of setting control points P1-P4 when the ink quantity changing pattern is "monotone decrease"
Figure 15B:
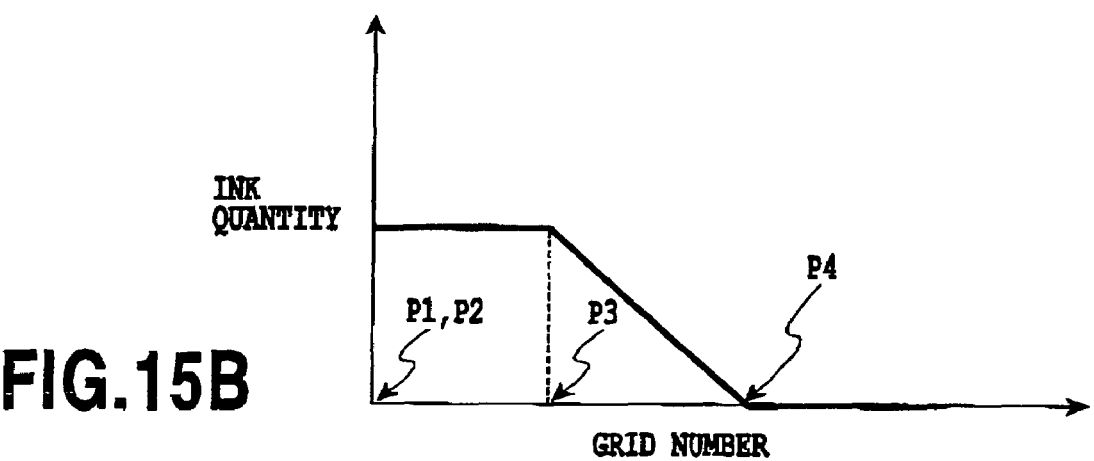
Figure 16A:
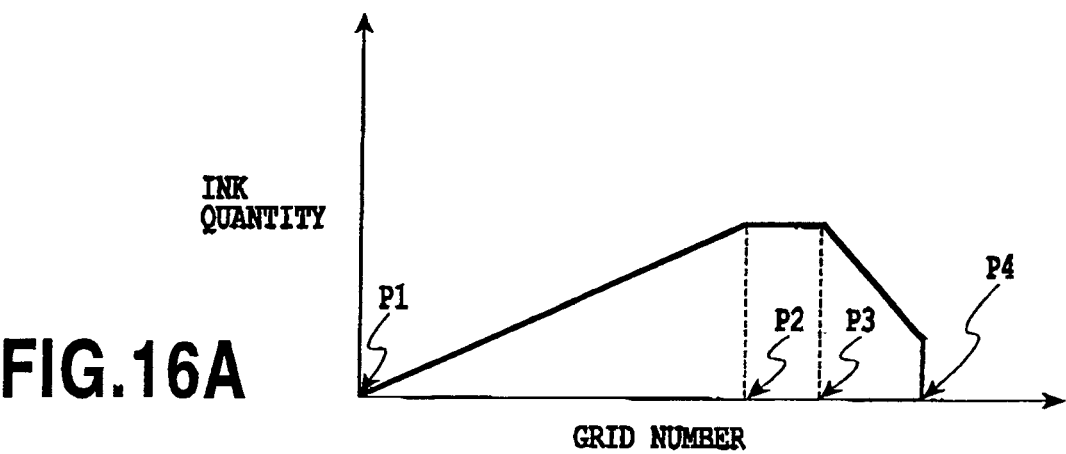
FIGS. 16A and 16B are diagrams illustrating examples of setting control points P1-P4 when the ink quantity changing pattern is "convex"
Figure 16B:
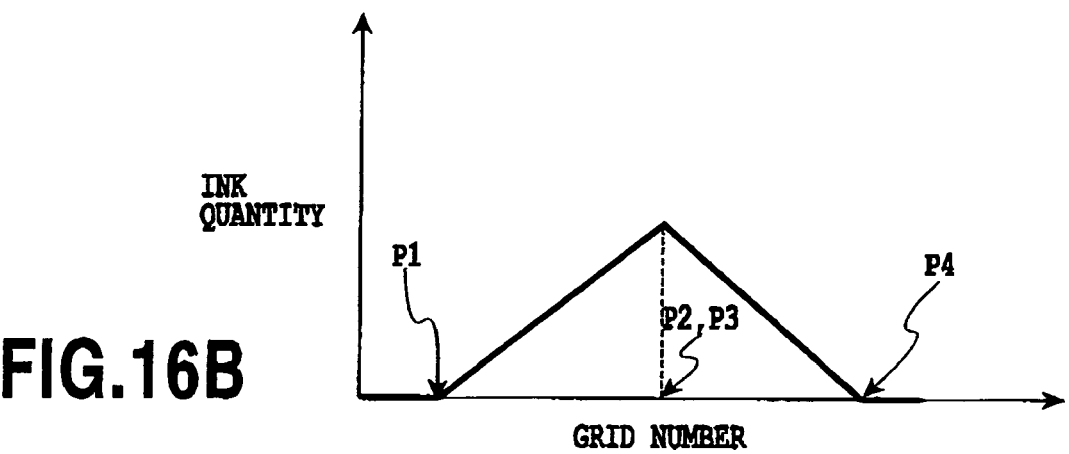

Likewise, FIGS. 14A and 14B are diagrams illustrating two examples of "monotone increase", where control point P1 is set to the left edge of the slope, control point P2 to the right edge of the slope, control points P3 and P4 to the right end. FIGS. 15A and 15B show two examples of "monotone decrease", where control points P1 and P2 are set to the left end, control point P3 to the left edge of the slope and control point P4 to the right edge of the slope. FIGS. 16A and 16B show two examples of "convex", where control point P1 is set to the left edge of the slope, control point P2 to the left end of the maximum, control point P3 to the right end of the maximum and control point P4 to the right edge of the slope.

Referring again to FIG. 11, at the next step S22, the interpolation method for the triangle is decided based on the combination of the ink quantity changing patterns for individual sides identified at step S21.

FIGS. 17A-17D are diagrams illustrating the relations between interpolation methods and combinations of identified ink quantity changing patterns for individual sides.

Figure 18A:
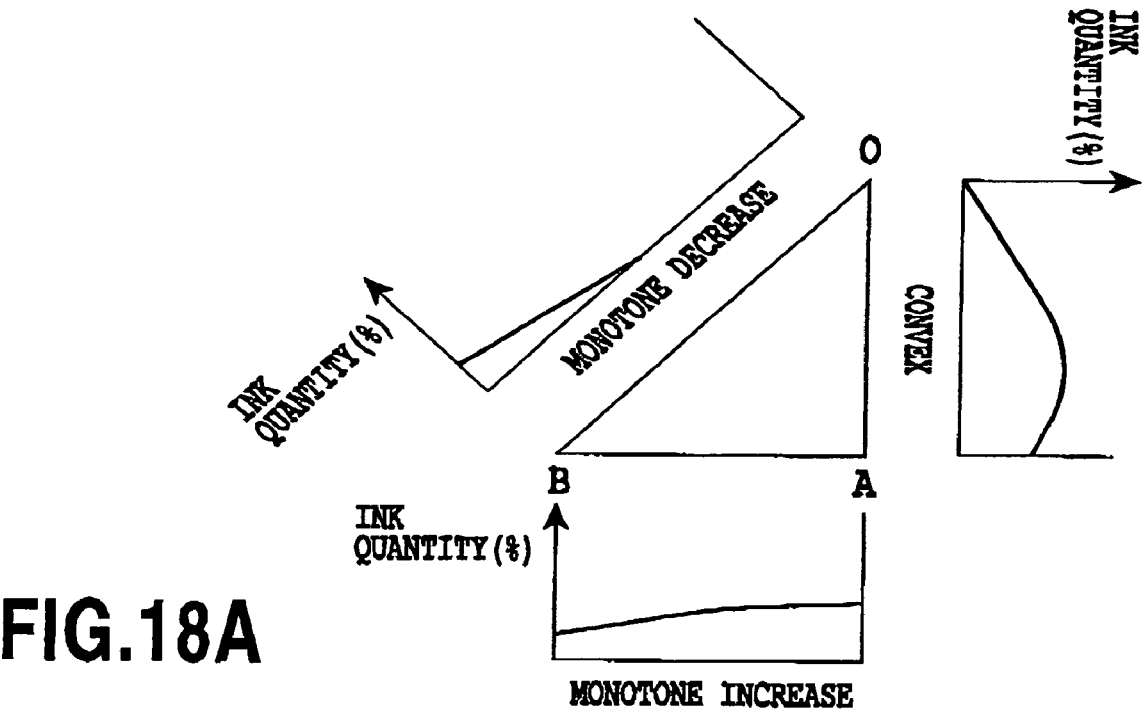
FIGS. 18A and 18B are diagrams illustrating a triangle that provide the same ink quantity changing pattern if inverted when identifying ink quantity changing patterns.
Figure 18B:
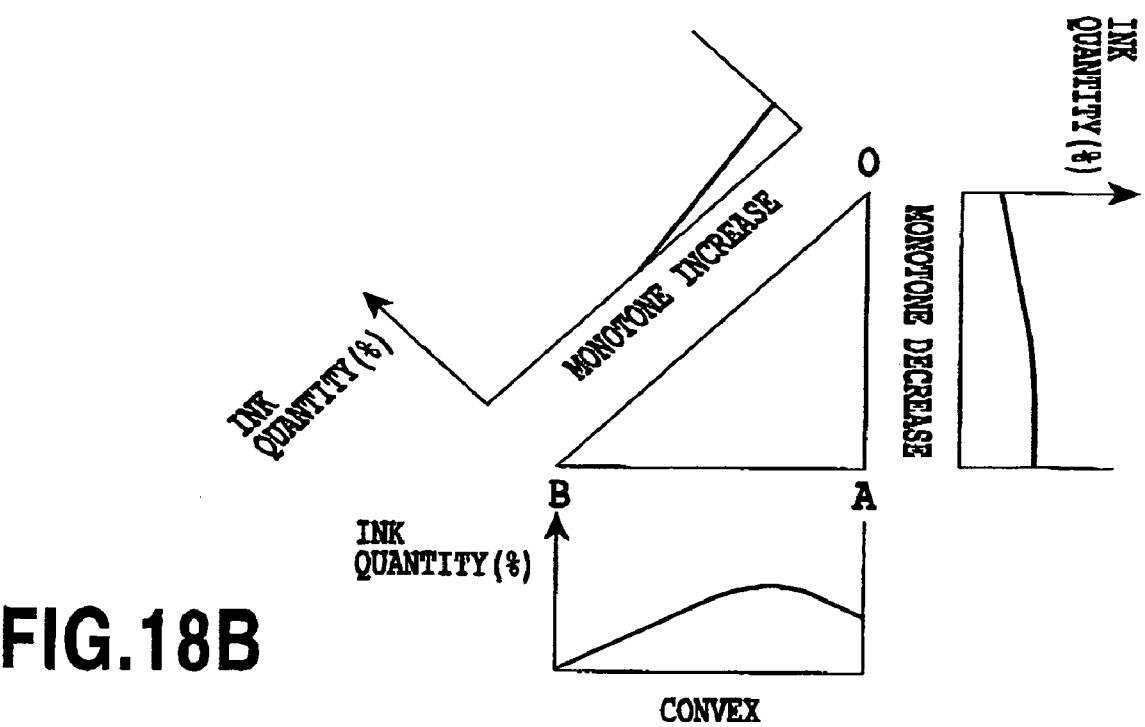
Figure 19A:
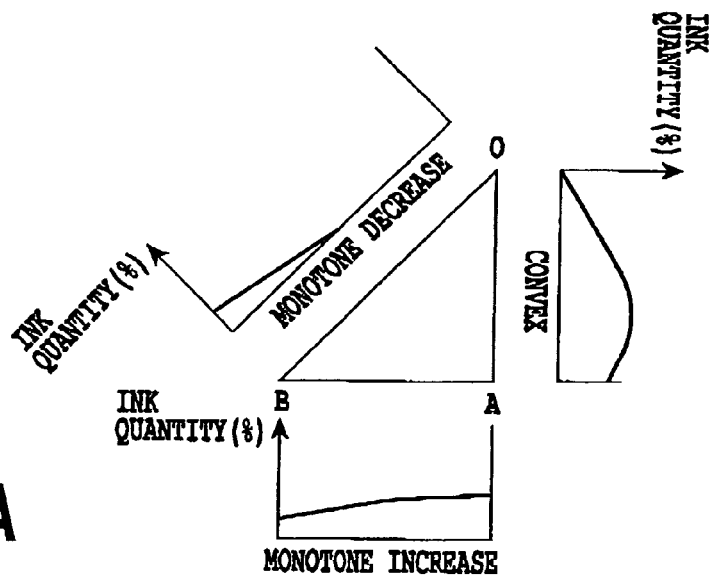
FIGS. 19A-19C are diagrams illustrating the triangles that provide the same ink quantity changing pattern if rotated when identifying ink quantity changing patterns.
Figure 19B:
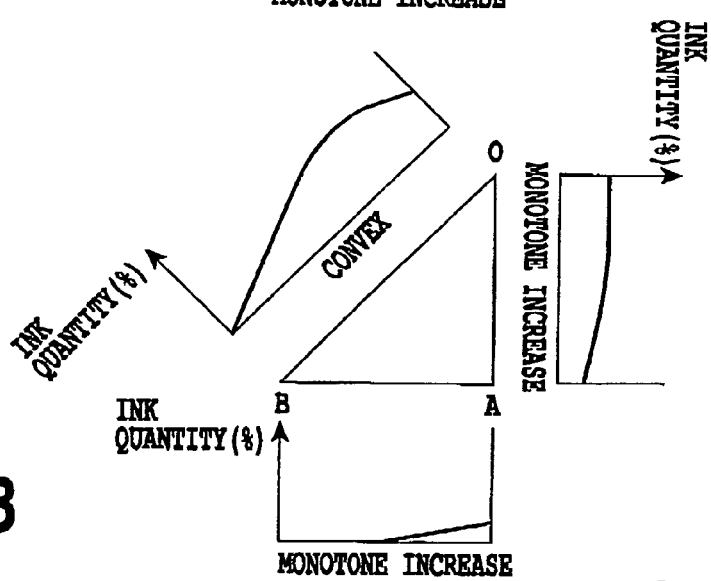
Figure 19C:
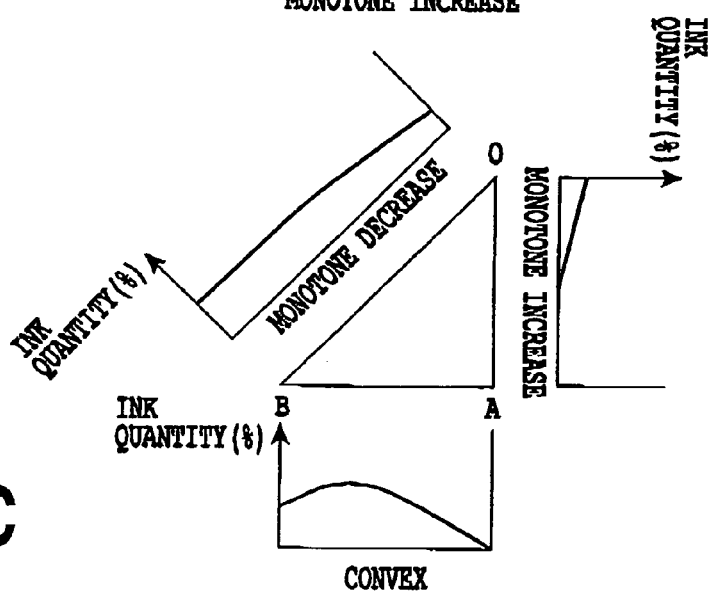

Specifically, the blanks In FIGS. 17A-17D have predetermined information about the types of interpolation according to the combinations of identified ink quantity changing patterns for individual sides. The interpolation method is determined based on this table. When determining an interpolation method, the same interpolation method is adopted when two ink quantity patterns are equal to each other, for example, when two patterns are symmetric to each other with respect to a line including vertex A as shown in FIGS. 18A and 18B or when two patterns are symmetric with respect to a point (rotatable relation) as show in FIGS. 19A-19C. As interpolation methods for this embodiment, there are five (I-V) interpolation methods as described later. In addition, there are cases needing no interpolation (such cases of impossible combination).

Next at step S23, an interpolation for the inside of the triangle is carried by the interpolation method decided as above at step S22. Now the five interpolation methods are described one by one with reference to FIGS. 20A-24C.

Interpolation Method I

Figure 20A:
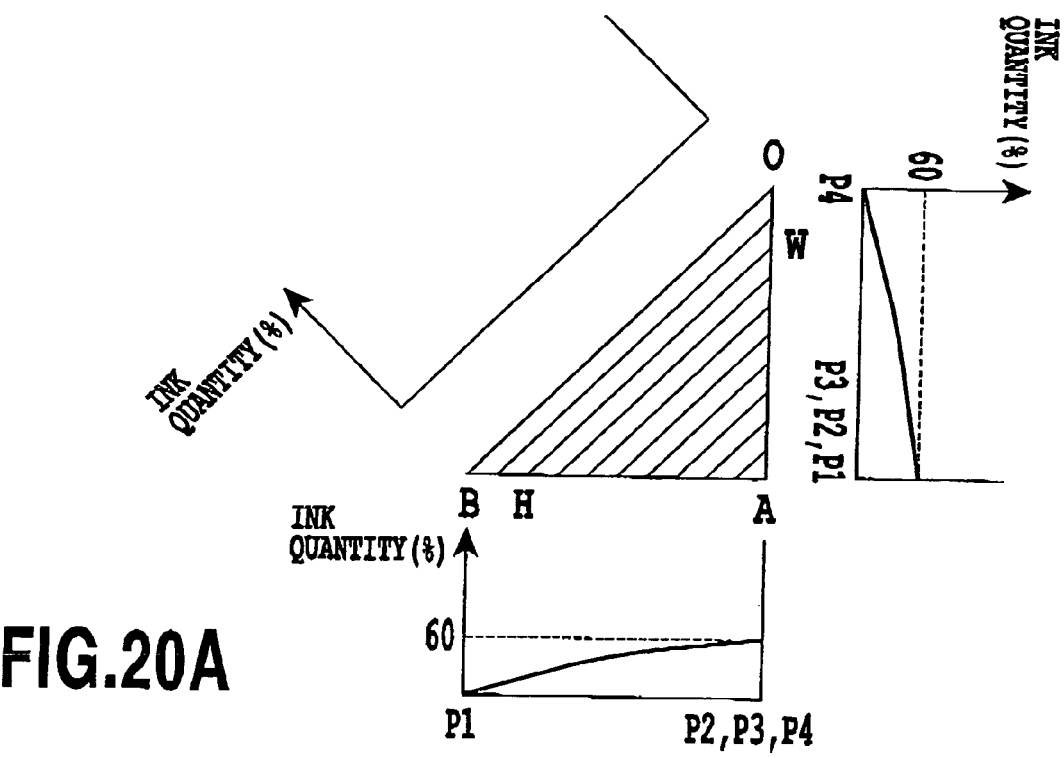
FIGS. 20A and 20B are diagrams illustrating interpolation method I for interpolation for the inside of a triangle in an embodiment of the invention.
Figure 20B:
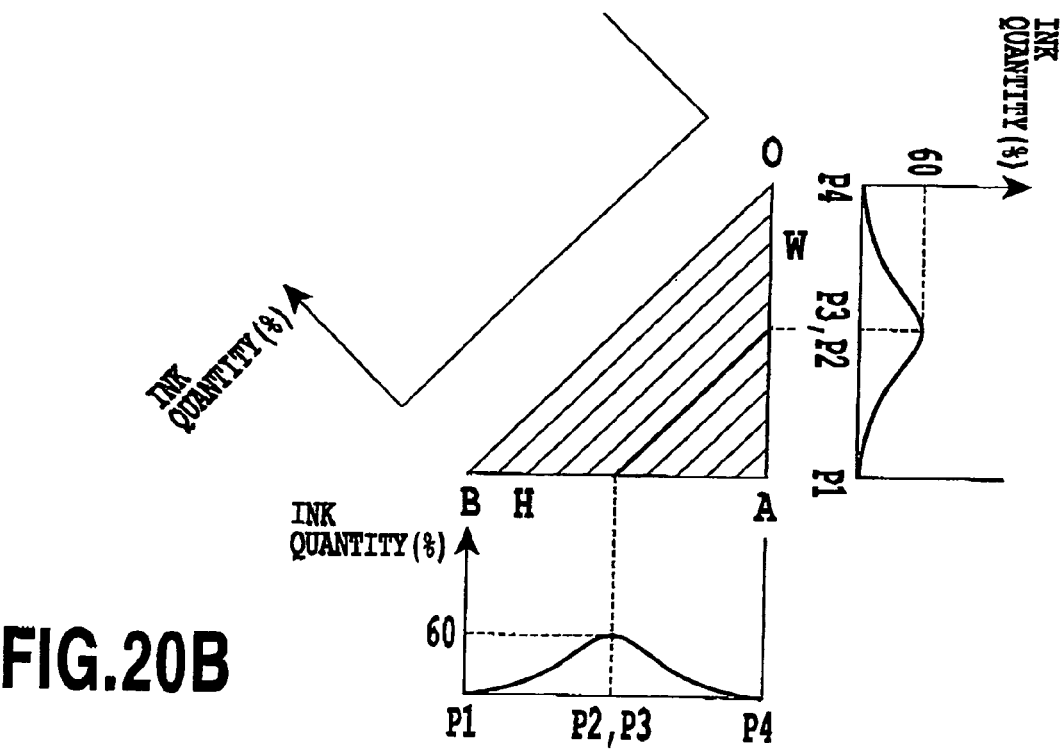

FIGS. 20A and 20B are diagrams illustrating two examples of interpolation by interpolation method I Interpolation method I is chosen when there are ink quantities corresponding only to side AO and BA or when the ink quantity is constant along side BO but changes (monotone decrease increase, convex/convex) along sides AO and BA, in the tables shown in FIGS. 17A-17D.

FIG. 20A shows the case where the ink quantity along side AO and that along side BA monotonously decreases and increases, respectively; and FIG. 20B shows the case where the ink quantity along side AO and that along side BA both have a maximum point (convex). Interpolation method I applied to both cases is described below in common with these two figures.

First, P1, P2, P3 and P4 on side BA (hereinafter, also expressed as P1BA, P2BA, P3BA and P4BA. Likewise, the other control points each have a suffix indicating a side.) are connected to P1BO, P2BO, P2BO and P4BO on side BO, respectively. In the ink quantity patterns along sides BA and BO shown in FIGS. 20A and 20B, a trapezoidal area formed by side P3AO-P2 BA and side P4AO-P1BA and a triangular area formed by side P1AO-P4BA (in reality, a point) and side P2AO-P3BA are defined (the examples shown on FIG. 20A are only triangular areas). The interpolation process is made on each of such two areas divided by the maximum point.

For example, in terms of the area surrounded by side P3AO-P2BA (point A shown in the example shown in FIG. 20A) and side P4AO-P1 BA in FIGS. 20A and 20B, the grid point on side P3AO-P4AO and that on side PLBA-P2BA, those points meeting the relation:

{(ink quantity at P3AO)−(ink quantity at P4AO)}:{(ink quantity at point W on side AO)−(ink quantity at P4AO)}={(ink quantity at P2BA)−(ink quantity at P1BA)}:{(ink quantity at point H on side BO)−(ink quantity at P1BA)}, are defined as grid point W and grid point H, respectively. The ink quantity at each grid point on side W-H is calculated by linear interpolation based on the ink quantity at grid point W and that at grid point H. The ink quantity at every grid point in the area is calculated by varying the positions of grid points W and H. Specifically, on side AO and side BA in the area, points H and W are positioned so that they have the same ratio to the ink quantity difference between the initiating point (P2AO, P1BA) and ending point (P4AO, P2BO). The ink quantity is interpolated using line HW.

By applying the above procedures to the other areas each having a specific ink changing pattern, interpolation can be conducted in a similar manner. Specifically, in the areas surrounded by point A and side P1AO-P4BA, by side P1AO-P4BA and side P2AO-P3BA, by side P2AO-P3BA and side P3AO-P2BA, by side P3AO-P2BA and side P4AO-P1BA, and by side P4AO-P1BA and side BO, the inside area can be linearly interpolated by setting grid points H and W as desired.

It is, however, obvious that the line (thick line in FIG. 20B) dividing the area in triangle BAO does not appear in such a case shown in FIG. 20A because side AO or BA has no maximum in ink quantity. Thus the above linear interpolation is conducted on only one area of triangle BAO.

Interpolation Method II

Figure 21:
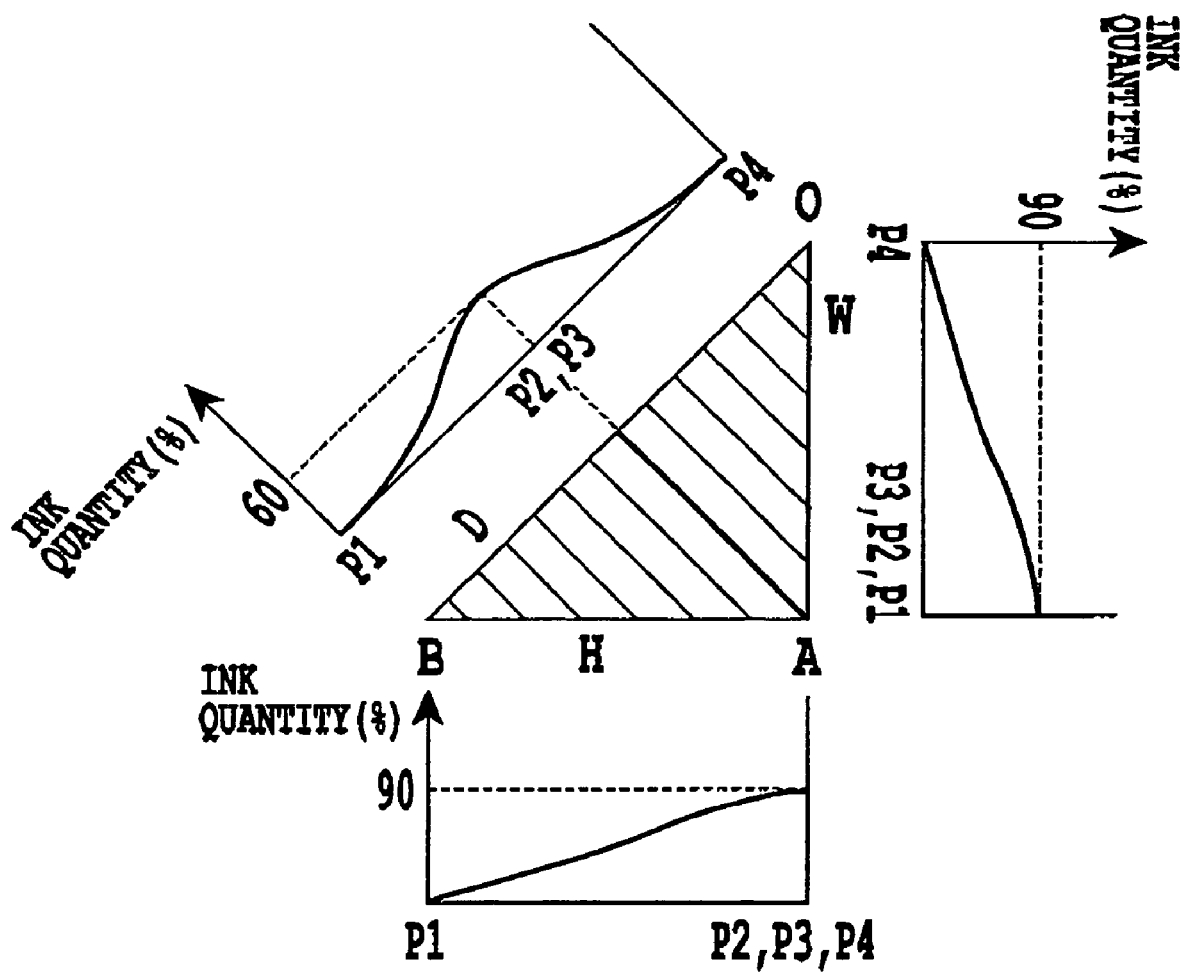
FIG. 21 is a diagram illustrating interpolation method II for interpolation for the inside of a triangle in an embodiment of the invention.

FIG. 21 is a diagram illustrating an example of interpolation method II. This interpolation method II is chosen when, for example, there are corresponding ink quantities in all the triangle sides AO, BO and BA and when the ink quantity changing pattern is monotone decrease along side AO, monotone increase along side BA, and convex along side BO.

As shown in the figure, side AO has grid points P1AO, P2AO, P3AO and P4AO, side BO has grid points P1BO, P2BO, P3BO and P4BO, and side BA has grid points P1BA, P2BA, P3BA and P4BA. Then P1BO is connected to P1BA, P2BO to P2BA, P3BO to P3AO, P4BO to P4AO, P3BA to P2AO, and P4BA to P1AO.

In those areas, for example, in the area surrounded by side P1BA-P2BO (point in this example) and side P2BA-P2BO, the grid point on side P1BA-P2BA and that on side P1BO-P2BO, those points meeting the relation:

{(ink quantity at P2BA)−(ink quantity at P1BA)}:{(ink quantity at point H on side BA)−(ink quantity at P1BA)}={(ink quantity at P2BO)−(ink quantity at P1BO)}:{(ink quantity at point D on side BO)−(ink quantity at P1BO)}, are defined as grid point H and grid point D, respectively.

The ink quantity at each grid point on side HD is calculated by linear interpolation based on the ink quantity of grid point H and that at grid point D. The ink quantity at every grid point in the area is calculated by varying the positions of grid points H and D. Specifically, in adjacent sides in the area (BA and BO in this example). points H and D are positioned so that they have the same ratio to the ink quantity difference between the initiating point (P1BA, P1BO) and ending point (P2BA, P2BO). The ink quantity at each grid point on line HD is thereby calculated by interpolation.

Meanwhile, in the interpolation for the triangle surrounded by P2BO-P2BA-P3BA (straight line in the example) and that surrounded by P3BO-P3AO-P2AO (straight line in the example), for example, in the former triangle, a desired point on side P2BA-P3BA is connected to point P2BO, and the ink quantities on this straight line are calculated by linear interpolation based on the ink quantities at both ends.

Interpolation Method III

Figure 22:
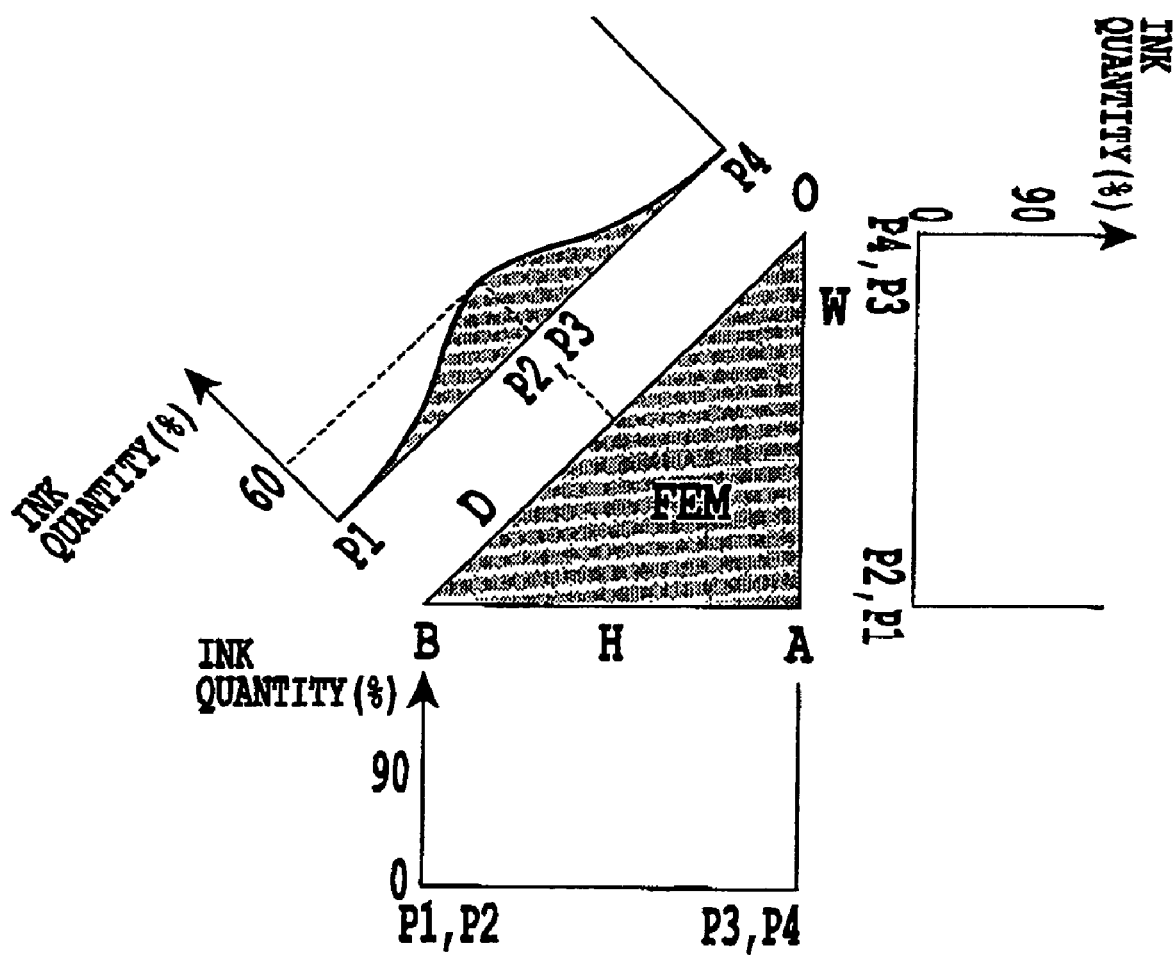
FIG. 22 is a diagram illustrating interpolation method III for interpolation for the inside of a triangle in an embodiment of the invention.

FIG. 22 is a diagram illustrating an example of interpolation by interpolation method III. This interpolation method III is chosen when, for example, there are corresponding ink quantities only along side BO, or when the ink quantity changing pattern is constant along sides AO and BA but convex along side BO.

In this case, the control points do not have such a one-to-one relation that was seen in the above interpolation methods I and II. Thus a two-dimensional non-linear interpolation using the finite element method (FEM) is adopted for interpolation. The finite element method (FEM) can provide, by a partial differential equation, an ink quantity for each grid point lying inside a closed space if a boundary condition is given. In the example shown in the figure, if the constant ink quantity along sides AO and BA and the convex ink quantity changing pattern along side BO are given as boundary conditions, the ink quantities for inside grid points are calculated. Because widely known FEM techniques can be used for this calculation, the explanation is not provided here.

Interpolation Method IV

Figure 23A:
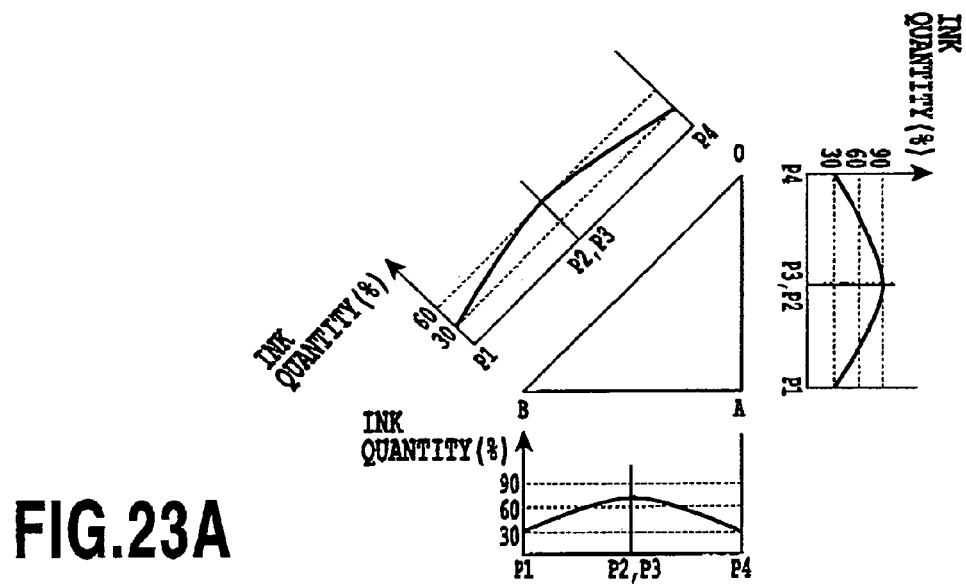
FIGS. 23A-23C are diagrams illustrating interpolation method IV for interpolation for the inside of a triangle in an embodiment of the invention.
Figure 23B:
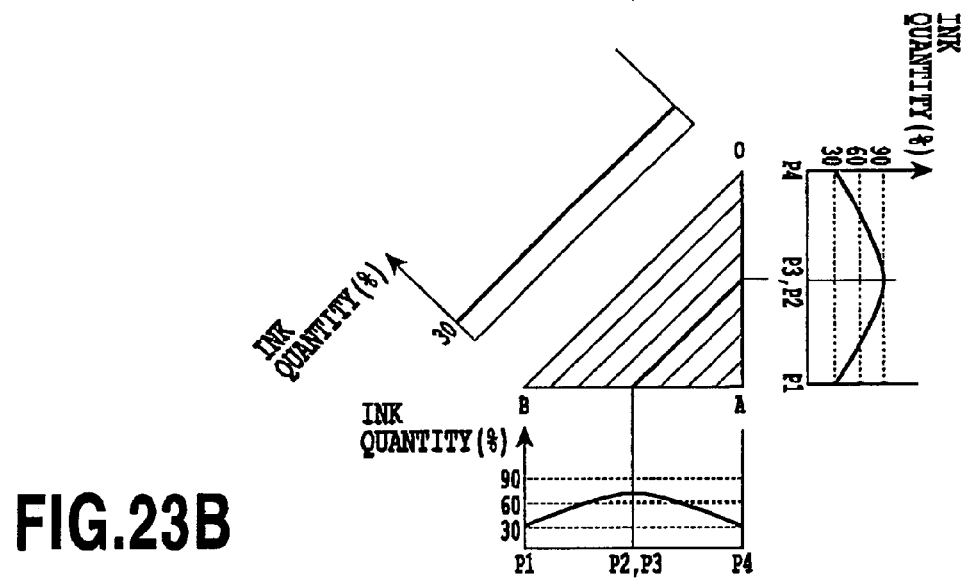
Figure 23C:
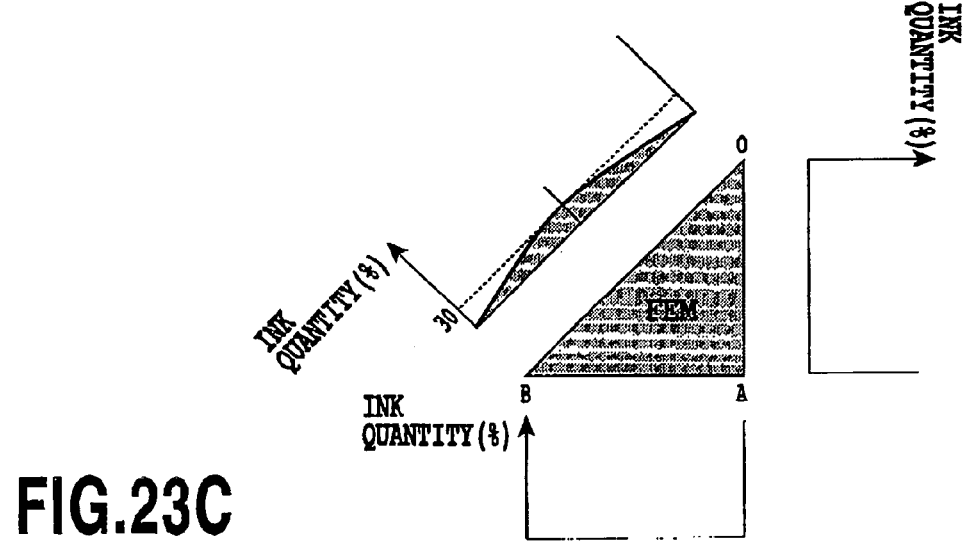

FIGS. 23A-23C are diagrams illustrating examples of interpolation by method IV. This interpolation method IV is chosen, for example, when there are ink quantities along all the triangle sides AO, BO and BA and when the ink quantity changing patterns along sides AO, BO and BA are all convex.

In this case, by comparing the ink quantities at the summit of each convex along the triangle sides and based on each ink quantity, an interpolation using both two-point interpolation method I and FEM interpolation method III is conducted on the grid points inside triangle OAB.

In the example shown in FIG. 23A, where the ink quantity at point P2AO>ink quantity at point P2BA>ink quantity at point P2BO, interpolation is made by two-point interpolation method I using two sides AO and BA having higher summit ink quantities, as shown in FIG. 23B. The interpolation result provided here is designated as E(i).

The ink quantities for the convex portion alone (portion between 30-60 ink quantity) where the portion of a constant base quantity has been removed are interpolated by finite element method (FEM) III, as shown in FIG. 23C. With this interpolation result being FEM(i), the interpolation result, D(i), for the ink quantity changing pattern of FIG. 23A is given by:

$D(i)=E(i)+FEM(i).$

In such a case where all three sides have convex patterns, a two-point interpolation method, for example, using two sides does not reflect the information of the rest one side. Then the continuity of ink quantity is lost across the rest side and internal grid points, and this discontinuity may cause a quasi line in the reproduced image. However, by this interpolation method IV, a two-dimensional interpolation reflecting the information of all the three sides can be made, and high quality images can be reproduced with excellent ink quantity continuity and nice gradation.

Interpolation Method V

Figure 24A:
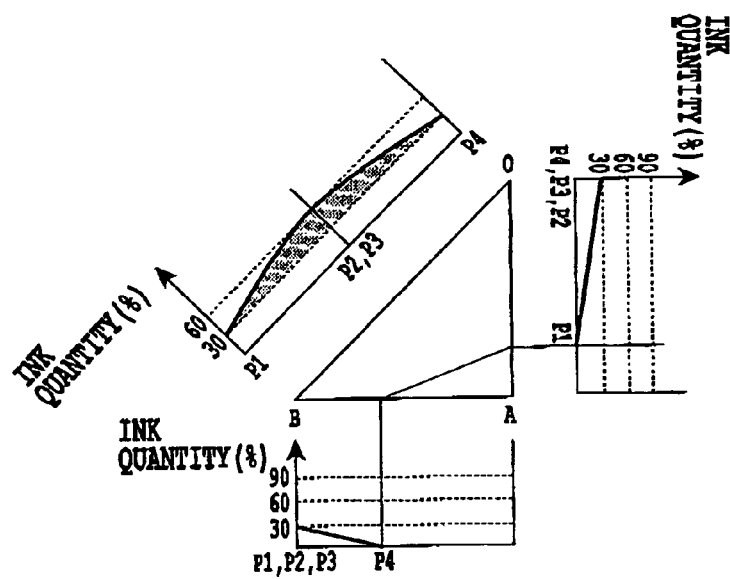
FIGS. 24A-24C are diagrams illustrating interpolation method V for interpolation for the inside of a triangle in an embodiment of the invention.
Figure 24B:
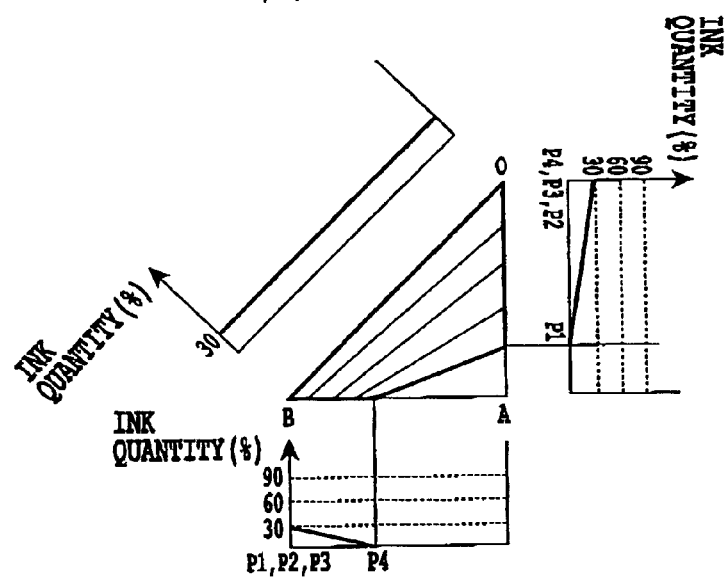
Figure 24C:
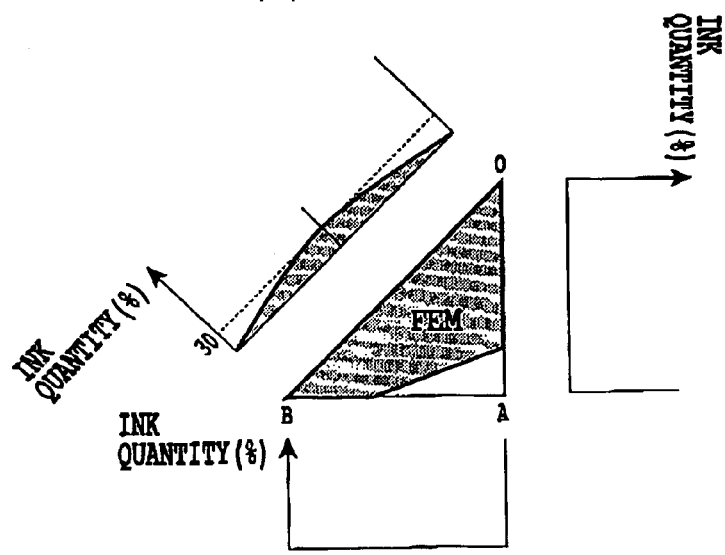

FIGS. 24A-24C are diagrams illustrating an example of interpolation by method V. This interpolation method V is chosen, for example, when there are ink quantities along all the triangle sides AO, BO and BA and when the ink quantity changing pattern along side AO is monotone increase, that along BO is convex, and that along BA is monotone decrease.

In this case, the interpolation for the grid points inside triangle OAB is carried out by both two-point interpolation method I and finite element method (FEM) for limited areas, like the case of interpolation method IV.

In the example shown in FIG. 24A, the ink quality rises from zero halfway along side AO, while halfway along side BA the ink quality becomes zero. In such a case, as shown on FIG. 24B, Interpolation is first made by interpolation method I based on the ink quantities along the side connecting point P1AO and P4BA on sides AO and BA and along the side connecting point P4BO and P1BO on side BO. This interpolation result is designated as E(i).

Then as shown in FIG. 24C, interpolation by the finite element method (FEM) is conducted only on the area (area surrounded by thick lines) where the ink quantity is not zero in FIG. 24B. In this case, the boundary condition of side OB is given by the ink quantity (portion of 30-60 ink quantity) along side BO of FIG. 24A where a base quantity is removed. The other boundary condition is zero. The interpolation result provided by the finite element method (FEM) is designated as FEM(i).

Then interpolation result D(i) for the ink quantity changing pattern of FIG. 24A is calculated by:

$D(i)=E(i)+FEM(i),$ like the case of interpolation method IV.

An Example of Real Interpolation

Figure 25:
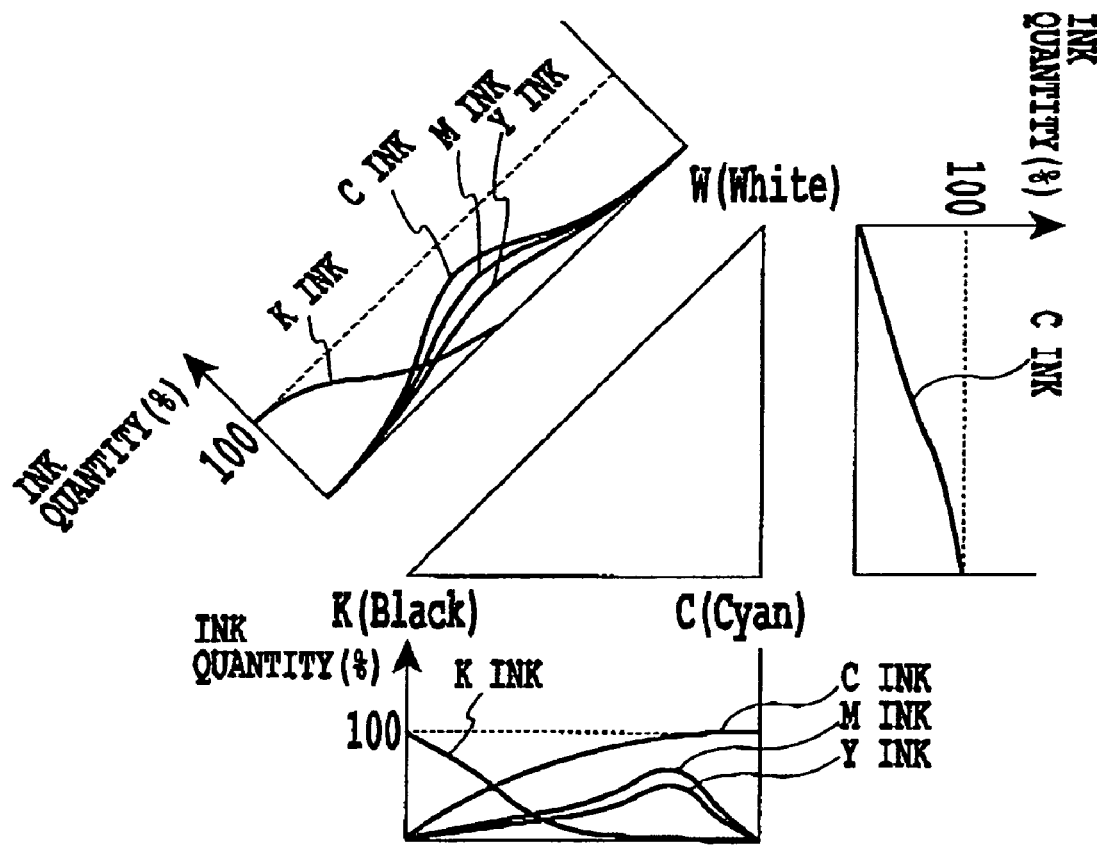
FIG. 25 is a diagram illustrating an example of ink quantity changing patterns for each side of the triangle having black, white and cyan vertexes as a result of interpolation for the inside of the triangle.

FIG. 25 shows, as an example, individual ink quantity change patterns for C, M, Y, K and Or for each side of the triangle surrounded by black(K), white(W) and cyan(C). In this case, with respect to the C ink, the ink quantity monotonously decreases along side CW and monotonously increases along side BC, while it changes in a convex pattern along side BW. Thus interpolation method II is adopted. With respect to the other inks, because only sides BC and BW have C, M, Y and K inks, interpolation is carried out by interpolation method I. Then the ink quantity (grid point data) for each grid point inside the triangle is determined In this triangle case, the grid point data value of the special color, orange (Or), is zero, so it does not appear in the figure.

As described above, according to the interpolation techniques of the embodiment, even when a special color, orange, other than such special colors as red and green which are secondary colors of cyan, magenta and yellow, is used as the printing material, It becomes possible to set the grid point of the special color on the color separation table to a grid point other than the vertexes of the cube. As a result, it also becomes possible to make the grid point density of the generated table uniform in the uniform color space and to generate a color separation table capable of reproducing colors without offset of tone.

When an orange printing material is used as a special color, because triangles W-Or-K and W-OrY-K including primary color Or and secondary color OrY do not lie in a plane formed only by the vertexes of the cube as the table, the subsequent interpolation process for the inside of the tetrahedron will become complex. However, by moving points Or and OrY to the vertexes of the cube, the interpolation for the inside the tetrahedron becomes as easy as that for the other tetrahedrons.

Embodiment 2

In the above embodiment, five colors C, M, Y, K and or are exemplified as printer ink colors. For the seven-color printer using light cyan and light magenta in addition to such five colors, an interpolation similar to the above embodiment can be made only by adding two ink colors.

Figure 26:
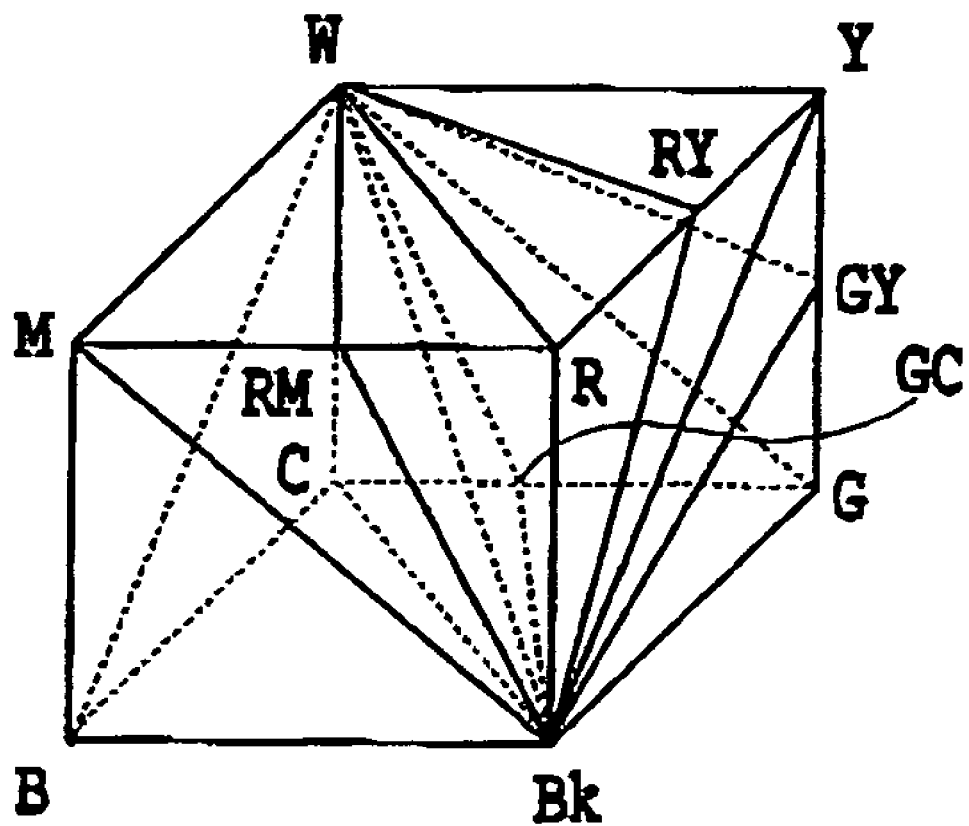
FIG. 26 is a diagram illustrating dividing color space in a six-color printer using C, M, K, Y, R and G inks.

Furthermore, when special colors red (R), green (G) and blue (B) other than Or are employed, points RM between R and M, RY between R and Y, GY between G and Y, and GC between G and C are set as shown in FIG. 26. When using such secondary colors, the above enlargement and reduction described in the embodiment makes internal interpolation easy.

Embodiment 3

The above embodiment has described an example in which the color separation table generated with a computer is downloaded to the printer and the controller in the printer carries out the color separation process. However, the invention can be applied to other cases; for example, the invention can be applied to such a case where the color separation table generated in the computer 1401 of FIG. 2 is set to the LUT in the printer driver.

Embodiment 4

In the above embodiment, the computer 1401 shown in FIG. 2 is used as the device that outputs image data to the printer. The application of the invention is not, however, limited to such a case. Indeed, the present invention can be applied to devices that can send image data to a printer, for example, those capable of temporarily restoring image data taken by, for example, a digital camera, and sending the image data to a printer.

The above embodiment has shown an example using an image data sending device (computer 1401) and a printer separately However, when image data inputted by an input means such as a digital camera is stored in a memory device and the printer has a mechanism of accepting the memory device, the present invention can be carried out with a printer alone.

From such viewpoints, the device that prepares the color separation table using the invention is called the image processing system in this specification.

Embodiment 5

The above embodiment has shown an example using a color measurement device as the patch sample input device, as shown in FIG. 2. The applicability of the present invention is not, however, limited to this example. The invention can be applied to devices such as flat-head scanners and drum scanners that can take the image data of printed materials in a computer and then examine the printer ink properties based on the taken image data.

Embodiment 6

In the above embodiment, the input color space for the ink color separation table that defines the color printer color restoring region has been explained as an RGB color space. This input color space is, of course, not limited to an RGB color space. For example, CMY and abc, which can define a printer color restoring region three-dimensionally using three parameters, can be adopted.

Embodiment 7

In the above embodiment, the ink quantity changing patterns along triangle sides during interpolation for the inside of a triangle are classified into four patterns, namely, constant, monotone increase, monotone decrease and convex. However, other patterns such as a hill and a saw tooth shape can be added. Also in the embodiment, four points P1-P4 are set for dividing the interpolation range of each side. The number of such points is not however limited to four.

The interpolation method for the inside of a triangle is not limited to those shown in the embodiments. For example, the ink quantity contours disclosed in aforementioned Patent 1 may be used.

Embodiment 8

In the above embodiments, an inkjet type printer has been exemplified. However, the printing method of the printing device such as a printer is not limited to the inkjet type, but the present invention can be applied to other publicly known printing devices. For example, this invention can be applied to electro-photographic printing devices, such as printers and copiers using an orange (or) toner as a special color in addition to C, M, Y and K toners.

Other Embodiments

An embodiment is also included In the category of the present invention, wherein program codes of software such as those shown in FIGS. 4, 5 and 11, for example, which realize the above described embodiments, are supplied to a computer in an apparatus or a system connected to various devices to operate these devices so as to implement the functions of the above described embodiments, so that the various devices are operated in accordance with the programs stored in the computer (CPU or MPU) of the system or apparatus.

In this case, the program codes of the software themselves implement the functions of the above described embodiments, so that the program codes themselves and means for supplying them to the computer, for example, a storage medium storing such program codes constitute the present invention.

The storage medium storing such program codes may be, for example, a floppy disk, a hard disk, an optical disk, a magneto-optical disk, a CD-ROM, a magnetic tape, a non-volatile memory card, or a ROM.

In addition, if the functions of the above described embodiments are implemented not only by the computer by executing the supplied program codes but also through cooperation between the program codes and an OS (Operating System) running in the computer, another application software, or the like, then these program codes are of course embraced in the embodiments of the present invention.

Furthermore, a case is of course embraced in the present invention, where after the supplied program codes have been stored in a memory provided in an expanded board in the computer or an expanded unit connected to the computer, a CPU or the like provided in the expanded board or expanded unit executes part or all of the actual process based on instructions in the program codes, thereby implementing the functions of the above described embodiments.

As described above, according to the embodiments of the invention, even when a special color other than cyan, magenta and yellow is additionally used as a new ink color, it is possible to generate a color separation table corresponding to such a special color ink by setting control points corresponding to the color reproducing property of the special color.

When a special color ink is used, the four triangles forming the new tetrahedron do not always lie on the grid points of the finally generated color separation table. This poses a problem that the internal interpolation becomes complex. According to the embodiments of the present invention, however, the internal interpolation can be carried out by a simple mechanism that moves the primary and secondary colors including the newly employed special color to the vertexes of the cube for enlargement of the tetrahedron including the special color, executes internal interpolation in a conventional tetrahedron and then reduces it to the original tetrahedron including the special ink.

As described above, according to the present invention, when generating a color separation table, the point of a special color other than colors corresponding to the vertexes of the cube is set on a side of the cube, which connects two vertexes of the cube corresponding to the color separation table defined by input colors. Then based on the color measurement of predetermined patches, grid point data is obtained for grid points on each of a line connecting two vertexes of black and white on the cube, a line running on the surface of the cube and connecting a plurality of vertexes of the cube, and a line running on the surface of the cube and connecting a plurality of the vertexes of the cube as well as the point of the special color. Then the cube is divided by those lines, and an interpolation process is executed on the plurality of divided solids based on grid point data of the grid points on those lines to obtain grid point data for the grid points located on other than those lines in each of the solids. Thereby even when a color other than color corresponding to the vertex of a cube in the three-dimensional color space defined by input colors such as RGB is used as a special color of a printing material, the color reproduction range of the special color can be effectively utilized. In addition, the grid point density can be made even in the uniform color space in relation with the color reproduction ranges of other colors. As a result, it is possible to perform color separation with high accuracy.

As a result, even when a special color other than red, green and blue, which are secondary colors of cyan, magenta and yellow, are employed as a special printing material, it is possible to provide an appropriate color separation table corresponding to the special color ink.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A method of generating a color separation table that stores grid point data of printing material colors used in a printing apparatus correspondingly to grid points that are defined by predetermined input colors for converting the predetermined input colors to the printing material colors, the printing material colors including a special color other than the predetermined input colors and the printing material colors corresponding to vertices of a solid formed by the grid points, said method comprising:

a special color point setting step, of setting a point of the special color on a side connecting two vertices of the solid;

a secondary color point setting step, of setting a point of secondary color between the special color and a color of the vertex that is one of two vertices of the side on which the special color is set;

a table data generating step, of, for the grid points on a line connecting two vertices of black and white on the solid, a plurality of lines running on the surface of the solid and connecting the two vertices through the vertices corresponding to the predetermined input colors or the printing material colors on the solid, a line running on the surface of the solid and connecting the two vertices through the set special color point and a line running on the surface of the solid and connecting the two vertices through the set secondary color point, obtaining the grid points data based on the color measurements of predetermined patches; and an interpolation step, of dividing the solid by the lines into a plurality of solids which include the lines as a side and executing an interpolation process on the plurality of divided solids based on the grid point data of the grid points on the lines of each of the divided solids to obtain grid point data for the grid points located on other than the lines in each of the divided solids.

2. A method as claimed in claim 1, wherein said interpolation step, when executing the interpolation on the plurality of divided solids to obtain the grid point data of the divided solids, for the divided solid including the line containing the point of the special color or the divided solid including the line containing the point of a secondary color of the special color and a color of the vertex, includes executing an enlargement process in which a coordinate of the point of the special color or the point of the secondary color is moved to one of two vertices of the side on which the points of the special color or the secondary color are set, executing the interpolation process on the enlarged solid, executing a reduction process in which the coordinate of the point of the special color or the point of the secondary color is moved to the original coordinate, and obtaining the grid point data of the grid points on the original divided solid based on the grid points and grid point data obtained by the interpolation on the enlarged solid.

3. A method as claimed in claim 1, wherein each of the divided solids is a tetrahedron and the interpolation process is executed such that the tetrahedron is divided into a plurality of triangles and the interpolation is executed on each of the divided triangles based on the grid point data of the grid points on three sides of each respective one of the three triangles to obtain the grid point data located on the surface of each triangle.

4. A method as claimed in claim 3, wherein the interpolation process based on the grid point data of the grid points on three sides of the triangle is a process based on the grid point data on the two sides of three sides, or a process using a finite element method based on the grid point data on any of one side, two sides or three sides of three sides.

5. A method as claimed in claim 1, wherein the printing material colors other than the special color are four colors of cyan, magenta, yellow and black or six colors of light cyan and light magenta in addition to cyan, magenta, yellow, black.

6. A method as claimed in claim 1, wherein the special color is a color of orange.

7. A method as claimed in claim 1, wherein the predetermined input colors are colors of red, green and blue.

8. An image processing apparatus for generating a color separation table that stores grid point data of printing material colors used in a printing apparatus correspondingly to grid points that are defined by predetermined input colors for converting the predetermined input colors to the printing material colors, the printing material colors including a special color other than the predetermined input colors and the printing material colors corresponding to vertices of a solid formed by the grid points, said apparatus comprising:

special color point setting means for setting a point of the special color on a side connecting two vertices of the solid;

secondary color point setting means for setting a point of secondary color between the special color and a color of the vertex that is one of two vertices of the side on which the special color is set;

table data generating means for, for the grid points on a line connecting two vertexes of black and white on the solid, a plurality of line running on the surface of the solid and connecting the two vertices through the vertices corresponding to the predetermined input colors or the printing material colors on the solid, a line running on the surface of the solid and connecting the two vertices through the set special color point and a line running on the surface of the solid and connecting the two vertices through the set secondary color point, obtaining the grid points data based on the color measurements of predetermined patches; and interpolation means for dividing the solid by the lines into a plurality of solids which include the lines as a side and executing an interpolation process on the plurality of divided solids based on the grid points data of the grid points on the lines of each of the divided solids to obtain grid point data for the grid points located on other than the lines in each of the divided solids.

9. An image processing apparatus as claimed in claim 8, wherein said interpolation means, when executing the interpolation on the plurality of divided solids to obtain the grid point data of the divided solids, for the divided solid including the line containing the point of the special color or the divided solid including the line containing the point of a secondary color of the special color and a color of the vertex, executes an enlargement process in which a coordinate of the point of the special color or the point of the secondary color is moved to one of two vertices of the side on which the points of the special color or the secondary color are set, executes the interpolation process on the enlarged solid, executes a reduction process in which the coordinate of the point of the special color or the point of the secondary color is moved to the original coordinate, and obtains the grid point data of the grid points on the original divided solid based on the grid points and grid point data obtained by the interpolation on the enlarged solid.

10. An image processing apparatus as claimed in claim 8, wherein each of the divided solids is a tetrahedron and the interpolation process is executed such that the tetrahedron is divided into a plurality of triangles and the interpolation is executed on each of the divided triangles based on the grid point data of the grid points on three sides of each respective one of the three triangles to obtain the grid point data located on the surface of each triangle.

11. A image processing apparatus as claimed in claim 10, wherein the interpolation process based on the grid point data of the grid points on three sides of the triangle is a process based on the grid point data on the two sides of three sides, or a process using a finite element method based on the grid point data on any of one side, two sides or three sides of three sides.

12. A method of generating a color separation table that stores grid point data of printing material colors used in a printing apparatus correspondingly to grid points that are defined by predetermined input colors for converting the predetermined input colors to the printing material colors, the printing material colors including a special color other than the predetermined input colors and the printing material colors corresponding to vertices of a solid formed by the grid points, said method comprising:

a special color point setting step, of setting a point of the special color on a side connecting two vertices of the solid;

a table data generating step, of, for the grid points on a line connecting two vertices of black and white on the solid, a plurality of lines running on the surface of the solid and connecting of the two vertices through the vertices corresponding to the predetermined input colors or the printing material colors on the solid and a line running on the surface of the solid and connecting the two vertices through the set special color point, obtaining the grid point data based on the color measurements of predetermined patches; and an interpolation step, of dividing the solid by the lines into a plurality of solids which include the lines as a side and executing an interpolation process on the plurality of divided solids based on the grid points data of the grid points on the lines of each of the divided solids to obtain grid point data for the grid points located on other than the lines in each of the divided solids, wherein the interpolation process, in a case where the divided solid includes the line containing the point of a secondary color between the special color and a color of the vertex that is one of two vertices of the side on which the special color is set, includes executing an enlargement process in which a coordinate of the point of the special color or the point of the secondary color is moved to one of two vertices of the side on which the points of the special color or the secondary color are set, executing the interpolation process on the enlarged solid, executing a reduction process in which the coordinate of the point of the special color or the point of the secondary color is moved to the original coordinate, and obtaining the grid point data of the grid points on the original divided solid based on the grid points and grid point data obtained by the interpolation on the enlarged solid.

13. A method as claimed in claim 12, wherein each of the divided solids is a tetrahedron and the interpolation process is executed such that the tetrahedron is divided into a plurality of triangles and the interpolation is executed on each of the divided triangles based on the grid point data of the grid points on three sides of each of the triangles to obtain the grid point data located on the surface of each triangle.

14. A method as claimed in claim 13, wherein the interpolation process based on the grid point data of the grid points on three sides of the triangle is a process based on the grid point data on the two sides of three sides, or a process using a finite element method based on the grid point data on any of one side, two sides or three sides of three sides.

15. A method as claimed in claim 13, wherein the printing material colors other than the special color are four colors of cyan, magenta, yellow and black or six colors of light cyan and light magenta in addition to cyan, magenta, yellow, black.

16. A method as claimed in claim 13, wherein the special color is a color of orange.

17. A method as claimed in claim 13, wherein the predetermined input colors are colors of red, green and blue.

18. An image processing apparatus for generating a color separation table that stores grid point data of printing material colors used in a printing apparatus correspondingly to grid points that are defined by predetermined input colors for converting the predetermined input colors to the printing material colors, the printing material colors including a special color other than colors corresponding to vertices of a solid formed by the grid points, said apparatus comprising:

special color point setting means for setting a point of the special color on a side connecting two vertices of the solid;

table data generating means for, for the grid points on each of a line connecting two vertices of black and white on the solid, a line running on the surface of the solid and connecting a plurality of vertices of the solid and a line running on the surface of the solid and connecting a plurality of the vertices of the solid as well as the point of the special color, obtaining the grid point data based on the color measurement of predetermined patches; and interpolation means for dividing the solid by the lines into a plurality of solids which include said line as a side and executing an interpolation process on the plurality of divided solids based on the grid point data of the grid points on the lines to obtain grid point data for the grid points located on other than the lines in each of the divided solids, wherein said interpolation means, when executing the interpolation on the plurality of divided solids to obtain the grid point data of the divided solids, for the divided solid including the line containing the point of the special color or the divided solid including the line containing the point of a secondary color of the special color and a color of the vertex, executes an enlargement process in which a coordinate of the point of the special color or the point of the secondary color is moved to one of two vertices of the side on which the points of the special color or the secondary color are set, executes the interpolation process on the enlarged solid, executes a reduction process in which the coordinate of the point of the special color or the point of the secondary color is moved to the original coordinate, and obtains the grid point data of the grid points on the original divided solid based on the grid points and grid point data obtained by the interpolation on the enlarged solid.

\* \* \* \* \*